United States Patent
Rosewell et al.

(10) Patent No.: US 10,482,175 B2
(45) Date of Patent: Nov. 19, 2019

(54) IDENTIFYING PROPERTIES OF A COMMUNICATION DEVICE

(71) Applicant: 51 Degrees Mobile Experts Limited, Reading (GB)

(72) Inventors: James William Rosewell, Reading (GB); Jonathan Daniel Rabin, London (GB); Benjamin James Shillito, Basingstoke (GB)

(73) Assignee: 51 DEGREES MOBILE EXPERTS LIMITED, Reading (GB)

( * ) Notice: Subject to any disclaimer, the term of this patent is extended or adjusted under 35 U.S.C. 154(b) by 77 days.

(21) Appl. No.: 15/686,066

(22) Filed: Aug. 24, 2017

(65) Prior Publication Data

US 2019/0034413 A1 Jan. 31, 2019

(30) Foreign Application Priority Data

Jul. 31, 2017 (EP) ..................................... 17184134

(51) Int. Cl.
*G06F 17/27* (2006.01)
*H04L 29/08* (2006.01)
(Continued)

(52) U.S. Cl.
CPC ...... *G06F 17/2765* (2013.01); *G06F 16/2246* (2019.01); *G06F 16/325* (2019.01); *G06F 17/27* (2013.01); *G06F 17/2705* (2013.01); *H04L 29/08* (2013.01); *H04L 67/025* (2013.01); *H04L 67/303* (2013.01)

(58) Field of Classification Search
None
See application file for complete search history.

(56) References Cited

U.S. PATENT DOCUMENTS

| | | |
|---|---|---|
| 5,655,129 A | 8/1997 | Ito |
| 7,010,522 B1 | 3/2006 | Jagadish et al. |

(Continued)

FOREIGN PATENT DOCUMENTS

| | | |
|---|---|---|
| EP | 2 871 816 A1 | 5/2015 |
| WO | WO 2009/101414 A2 | 8/2009 |

OTHER PUBLICATIONS

Communication mailed by European Patent Office dated Jun. 24, 2015, in European Application No. 13192291.6-1870 (5 pages).

(Continued)

*Primary Examiner* — Marcus T Riley
(74) *Attorney, Agent, or Firm* — Finnegan, Henderson, Farabow, Garrett & Dunner LLP

(57) ABSTRACT

A communication device is arranged to transmit a character string that identifies the device. The character string comprises a plurality of substrings, each of which comprises a sequence of characters. A property of the device is identified using a data structure having multiple nodes, wherein each of a plurality of nodes stores a respective hash value. Each hash value corresponds to the hash value that would be generated by performing a hash function on the sequence of characters of each substring. The data structure comprises references between the plurality of nodes, and the references define a path through the data structure that identifies the device. A node on the path is associated with a property of the device.

20 Claims, 9 Drawing Sheets

(51) Int. Cl.
   *G06F 16/31*   (2019.01)
   *G06F 16/22*   (2019.01)

(56) References Cited

U.S. PATENT DOCUMENTS

| | | | | |
|---|---|---|---|---|
| 8,234,106 | B2* | 7/2012 | Marcu | G06F 17/2735 |
| | | | | 704/10 |
| 9,332,086 | B2* | 5/2016 | Rosewell | H04L 67/303 |
| 9,350,823 | B2* | 5/2016 | Rosewell | H04L 67/303 |
| 9,736,147 | B1* | 8/2017 | Mead | H04L 63/083 |
| 9,875,264 | B2* | 1/2018 | Rosewell | H04L 67/303 |
| 2002/0103881 | A1 | 8/2002 | Granade et al. | |
| 2002/0116534 | A1 | 8/2002 | Teeple | |
| 2003/0186722 | A1 | 10/2003 | Weiner | |
| 2004/0117396 | A1 | 6/2004 | Avadhanam et al. | |
| 2006/0101503 | A1 | 5/2006 | Venkataraman et al. | |
| 2006/0259498 | A1 | 11/2006 | Ellison et al. | |
| 2007/0240222 | A1* | 10/2007 | Tuvell | G06F 21/56 |
| | | | | 726/24 |
| 2009/0171953 | A1 | 7/2009 | Morris et al. | |
| 2009/0288136 | A1 | 11/2009 | Chang et al. | |
| 2010/0192225 | A1 | 7/2010 | Ma et al. | |
| 2012/0130983 | A1 | 5/2012 | Ryan et al. | |
| 2012/0317098 | A1 | 12/2012 | Okato et al. | |
| 2013/0031072 | A1 | 1/2013 | Passani | |
| 2013/0066898 | A1 | 3/2013 | Wu | |
| 2013/0226885 | A1 | 8/2013 | Ottaviano | |
| 2014/0201838 | A1* | 7/2014 | Varsanyi | G06F 21/552 |
| | | | | 726/23 |
| 2015/0127565 | A1* | 5/2015 | Chevalier | G06Q 10/00 |
| | | | | 705/319 |
| 2015/0134810 | A1* | 5/2015 | Rosewell | H04L 67/303 |
| | | | | 709/224 |
| 2015/0134811 | A1* | 5/2015 | Rosewell | H04L 67/303 |
| | | | | 709/224 |
| 2016/0232190 | A1* | 8/2016 | Rosewell | H04L 67/303 |
| 2016/0292276 | A1* | 10/2016 | Denninghoff | H03H 9/02622 |
| 2019/0034413 | A1* | 1/2019 | Rosewell | G06F 17/27 |

OTHER PUBLICATIONS

Communication mailed by European Patent Office dated Mar. 27, 2014, in European Application No. 13192291.6-1870 (7 pages).
Communication mailed by European Patent Office dated Feb. 2, 2015, in European Application No. 13192291.6-1870 (4 pages).
51Degrees.mobi Limited, "51 Degree.Mobi", 51degrees.mobi/support/Documentation/Net/Summary.aspx, copyright 2010-2013, accessed Dec. 19, 2013 (2 pgs.).
"Class API", http://docs.deviceatlas.com/apis/enterprise/java1.7/mobi/mtld/da/API.html, copyright 2013, accessed Dec. 19, 2013 (14 pgs.).
ScientiaMobile Inc., "WURFL-Mobile Device Database", wurfl.sourceforge.net/wurfl_schema.php, Copyright 2012, accessed Dec. 19, 2013 (3 pgs.).
"MobileESP", http://code.google.com/mobileesp/source/browse/Java/UAgentinfo.java, Copyright 2010-2013, accessed Dec. 19, 2013 (16 pgs.).
Luca Passani, "Online Contributors Help—ScientiaMobile, Inc.", https://db.scientiamobile.com/static/contributors_help.htm#topdoc, accessed Dec. 19, 2013 (14 pgs.).
Non-Final Office Action issued in U.S. Appl. No. 14/085,223, dated Apr. 15, 2015.
Final Office Action issued in U.S. Appl. No. 14/085,223, dated Oct. 23, 2015.
Non-Final Office Action issued in U.S. Appl. No. 14/085,301, dated Apr. 8, 2015.
Final Office Action issued in U.S. Appl. No. 14/085,301, dated Sep. 25, 2015.
Non-Final Office Action issued in U.S. Appl. No. 15/133,048, dated Jan. 12, 2017.
The Extended European Search Report and the European Search Opinion issued in European Application No. 17184134.9; dated Feb. 2, 2018 (10 pgs.).
Kniesburges, Sebastian et al.: "Hashed Patricia Trie: Efficient Longest Prefix Matching in Peer-to-Peer Systems"; University of Paderborn, Germany; WALCOM 2011, LNCS 6552, pp. 170-181, 2011; © Springer-Verlag Berlin Heidelberg 2011 (12 pgs.).
Morrison, Donald R.: "PATRICIA—Practical Algorithm to Retrieve Information Coded in Alphanumeric"; Sandia Lab, Albuquerque, New Mexico; Journal of the Association for Computing Machinery, vol. 15, No. 4, Oct. 1968, pp. 514-534 (21 pgs.).

* cited by examiner

Fig. 5

| Profiles | | | | | | | | | | | | |
|---|---|---|---|---|---|---|---|---|---|---|---|---|
| Component: | | | Hardware | | | Properties | RegExs | Images | Notes | Options | | |

| U | R | I | C | Vendor | M |
|---|---|---|---|---|---|
| 1 | 2 | ☑ | 3 | Lenovo | |
| 2 | 1 | ☑ | 2 | Samsung | |
| 3 | 2 | ☑ | 4 | Samsung | |
| 4 | 3 | ☑ | 1 | Lenovo | |
| 5 | 4 | ☑ | 4 | Bmobile | |
| 1 | 3 | ☑ | 3 | ZTE | |
| 2 | 1 | ☑ | 1 | OPPO | |

| | Property | | Value |
|---|---|---|---|
| 4 | HardwareVe | 🕒 | Samsung |
| 3 | HardwareFa | 🕒 | Galaxy Ace 3 |
| 2 | HardwareM | 🕒 | GT-S7272 |
| - | HardwareNa | 🕒 | Galaxy Ace 3 |
| 0 | BitsPerPixel | 🕒 | 24 |
| 0 | DeviceUrl | 🕒 | www.samsu |
| 0 | Has3DCame | 🕒 | False |
| 0 | Has3DScree | 🕒 | False |

| | Value |
|---|---|
| ☐ | Asmobile |
| ☐ | Accel |
| ☐ | Acer |
| ☐ | Advan |
| ☐ | AEG |
| ☐ | AGM |
| ☐ | AGPtek |

|◄◄ 12 of 45 ►►|

| Profiles | |
|---|---|
| Component: Hardware | Properties RegExs Images Notes Options |

| U | R | I | C | Vendor | M |
|---|---|---|---|---|---|
| 1 | 2 | ☑ | 3 | Lenovo | |
| 2 | 1 | ☑ | 2 | Samsung | |
| 3 | 2 | ☑ | 4 | Samsung | |
| 4 | 3 | ☑ | 1 | Lenovo | |
| 5 | 4 | ☑ | 4 | Bmobile | |
| 1 | 3 | ☑ | 3 | ZTE | |
| 2 | 1 | ☑ | 1 | OPPO | |

⇒ GT-S7272 Build

Pattern: [0][0]

GT-S7272 Build

Negative Expr ☐

| X | O | P | I | UserAgent |
|---|---|---|---|---|
| ✓ | | X | | Mozilla/5.0(Linux; Android 4.2.2; en-gb; SAMSUNG GT-S7272 Build/JDQ39) |
| ✓ | | | | Mozilla/5.0(Linux; Android 4.2.2; en-gb; SAMSUNG GT-S7272 Build/JDQ40) |
| ✓ | | | | Mozilla/5.0 (Linux; U; Android 4.2.2; en-gb; GT-S7272 Build/JDQ39) |

|◄◄ 1 of 32 ►►|    [ OK ]  [ Apply ]  [ Cancel ]

Fig. 6

IDENTIFYING PROPERTIES OF A COMMUNICATION DEVICE

CROSS-REFERENCE TO RELATED APPLICATION

This application is based upon and claims priority to EP Patent Application No. 17184134, filed Jul. 31, 2017, the entire contents of which are incorporated herein by reference.

TECHNICAL FIELD

The present disclosure relates to telecommunications. In particular, the present disclosure relates to identifying the properties of a communication device, and also to generating information for use in identifying the properties of a communication device.

BACKGROUND

Owners of web sites need to understand the capabilities of client communication devices accessing their web sites in order to optimise the content provided to different device types. For example, a news organisation's web page containing an article will be surrounded by areas highlighting other articles to which the reader can progress. On a mobile phone, a single area listing further articles might be displayed at the top of the page using plain text. On a desktop web browser with its larger screen, multiple areas listing additional articles including thumbnail images could be displayed above and to the right of the article. In both cases, the article's content will be identical. FIG. 1 shows an example layout of a web page on a mobile phone screen, in which content area 1 floats at the top of the page and always remains in view. FIG. 2 shows an example layout of the same web page for a desktop or laptop computer screen, in which two content areas are shown. The web page shown in FIG. 2 is the same as that shown in FIG. 1, but more content has been added to the right of the page in area 2 and area 1 is larger and does not float at the top of the page.

Web site owners also need to include characteristics of client communication devices in analysis of web usage in order to understand if user behaviour varies by device type. For example, analysis of the percentage of people failing to read a second news article by screen size may provide the information needed to improve the user interface on devices that correlate with a higher than average failure to read further news articles.

The Hyper Text Transfer Protocol (HTTP) specification advises client devices to include headers to control how a request to a server should be managed by the server. Example headers include preferred language, cookies containing information about previous requests, the types of media the device can support and information about the device. The most widely used header for the identification of device capabilities is known as a User-Agent. A User-Agent is a string of characters that a communication device can transmit to a remote service, such as a web server. The User-Agent contains information about the properties of a communication device, such as the device's hardware, operating system and web browser. Upon receiving a User-Agent from a particular communication device, the remote service can analyse the User-Agent in order to determine the properties of that device.

Whilst the HTTP specification advises devices to transmit a User-Agent header, it provides no guidance concerning the structure of the character string that the header contains. As a result, a wide variety of User-Agent conventions exist, and the structure of User-Agents continues to evolve. Table 1 shows some examples of User-Agents.

TABLE 1

| Row | Example User-Agent | Explanation |
| --- | --- | --- |
| 1 | Mozilla/5.0 (compatible; MSIE 9.0; Windows NT 6.1; WOW64; Trident/5.0) | Used by Microsoft to identify different versions of Internet Explorer on desktop or laptop devices. |
| 2 | Mozilla/5.0 (compatible; Baiduspider/2.0; +http://www.baidu.com/search/spider.html) | Used by the Baidu search engine to identify its web site crawler. |
| 3 | Mozilla/5.0 (iPhone; CPU iPhone OS 6_1_3 like Mac OS X) AppleWebKit/536.26 (KHTML, like Gecko) Version/6.0 Mobile/10B329 Safari/8536.25 | Used by Apple to identify iPhone type devices. |
| 4 | Mozilla/5.0 (Linux; U; Android 4.0.4; en-us; SPH-D710 Build/IMM76I) AppleWebKit/534.30 (KHTML, like Gecko) Version/4.0 Mobile Safari/534.30 | Used by manufacturers of Android based devices to identify their devices. |
| 5 | HUAWEI Y320-T00_TD/1.0 Android 4.0.3 Release/10.01.2012 Browser/WAP2.0 appleWebkit/534.30 | Used by Huawei to identify its Y320 smartphone |

User-Agents do not follow any defined rules and usually only the inclusion of the prefix "Mozilla/5.0" and some information between succeeding brackets can be expected. However, the User-Agent in Row 5 of Table 1 does not even contain the prefix "Mozilla/5.0" or any brackets.

Different hardware and software vendors use different formats for their User-Agents. In the Apple example at Row 3 of Table 1, the type of device can be found by looking at the string immediately following the first bracket. In the case of Row 3 of Table 1, the string is "iPhone" indicating the device is an Apple iPhone. However, the Android example at Row 4 of Table 1 contains a string indicating the device's model number before the string "Build". In the case of Row 4 of Table 1, the string is "SPH-D710" indicating the device is a Samsung Galaxy S II. The Baidu search engine example at Row 2 of Table 1 contains no information about the type of device, but instead includes the Uniform Resource Locator (URL) "http://www.baidu.com/search/spider.html".

Some hardware and software vendors also include serial number information within the User-Agent to uniquely identify a specific communication device. As a result, there is a vast number of User-Agent headers in use today. The number is increasing non-linearly and for practical purposes is infinite.

To identify the properties of a communication device accessing a web site, two things are required:
1. information about devices, including details of the hardware, operating system and browser information; and
2. a method of relating User-Agents, and other relevant HTTP headers, to entities contained within the information about devices.

Regular Expressions and tries are two methods currently used to achieve the latter requirement.

Regular Expressions (RegExs) are a method of matching patterns within a string of characters. Open source projects such as DetectMobileBrowsers.com (http://detectmobile-browsers.com/) use a long list of RegExs to determine if a device is a mobile browser, or a traditional desktop or laptop based browser. RegEx based algorithms require relatively little storage space to store the list of RegExs. However, as the number of User-Agents increases, more RegExs need to be evaluated when a request is received by a web site to achieve an accurate and useful result. The number of User-Agents is now so great that the time taken to execute these RegExs is longer than web site owners wish to wait for the resulting device characteristics to be provided. For a web site where response time is extremely important, it is unacceptable to wait even 5 milliseconds whilst all the available central processing unit (CPU) capacity is used to determine the characteristics of the requesting device. A faster solution is required. Furthermore, the accuracy of the results provided by RegEx-based algorithms is often so poor as to be unusable.

Trie data structures can be used to provide considerably faster results, as they reduce the number of complex calculations which need to be performed. A trie is a type of tree data structure that is particularly suited for storing character strings, such as User-Agents. A typical trie has one node for every common prefix, with additional strings contained in child nodes culminating in a leaf node. The trie is evaluated from the root node down. Trie data structures are commonly used for dictionary applications to determine if a word is valid and to suggest alternative words. They work very well in such applications where there are hundreds of thousands of possible results. When used for device identification, however, tries need to be populated with tens of millions of possible User-Agents in order to maintain the required level of accuracy. Tries for accurate device identification are very large, typically more than several gigabytes. As such they are only suitable for web sites that have a large amount of available storage. They are unsuited to small and medium sized web sites that operate on relatively constrained CPU and memory resources.

The applicant's earlier patent, European Patent No. 2 871 816, discloses a method of identifying a property of a communication device. A plurality of data structures (such as trie data structures) are provided, each of which is designated for storing substrings that occur at a particular character position in a character string (such as a User-Agent). Each data structure comprises one or more entries, each of which comprises a substring. Data representing an association between each entry and a respective profile is stored, wherein each profile includes a value of at least one property of a communication device. The property of a communication device can be identified by searching the plurality of data structures for substrings of a character string that identifies the device (such as its User-Agent).

The method described in European Patent No. 2 871 816 is very accurate, requires less storage than prior trie based algorithms, and is capable of accurately identifying a device from a large corpus of known devices faster than RegEx based algorithms. It is nevertheless desirable to reduce storage requirements even further and/or to identify a device even faster, whilst maintaining a high level of accuracy.

SUMMARY

A first aspect of the present disclosure provides a computer-implemented method of generating information for use in identifying a property of a communication device, the method comprising: receiving training data comprising a plurality of character strings, wherein each character string identifies a respective communication device; identifying a plurality of substrings within each character string, each substring comprising a sequence of characters; and creating a data structure having multiple nodes by associating each of a plurality of nodes of the data structure with a respective substring by storing a hash value generated by performing a hash function on the sequence of characters of the substring, creating references between nodes to define a plurality of paths through the data structure, whereby each path identifies a respective communication device, and associating a node in each path with a property of the communication device identified by that path.

The method may further comprise associating at least one of the plurality of nodes with a plurality of different substrings. The plurality of different substrings may include at least one of: different sequences of characters occurring at a common character position in the character strings of different communication devices; and different sequences of characters occurring at different character positions in the character strings of different communication devices. In this case, associating at least one of the plurality of nodes with a plurality of different substrings may comprise storing a plurality of hash values, each generated by performing the hash function on a respective one of the different sequences of characters. Alternatively or additionally, the plurality of different substrings may include at least one of: a common sequence of characters occurring at different character positions in the character strings of different communication devices; and different sequences of characters occurring at different character positions in the character strings of different communication devices. In this case, associating at least one of the plurality of nodes with a plurality of different substrings may comprise: associating at least one of the plurality of nodes with data indicating the different character positions at which each sequence of characters of the different substrings can occur in the character strings of different communication devices.

The hash function may be a rolling hash function. The method may further comprise: calculating a computational efficiency score for a plurality of substrings; and associating nodes closest to the root node with substrings having the highest computational efficiency scores. The computational efficiency score may be based on: how effectively the data structure would be split into a plurality of branches with an equal number of leaf nodes by associating a node with a particular substring; and/or the computational effort required to find the hash value for the substring in a node.

A further aspect of the present disclosure provides a computer-implemented method of identifying a property of a communication device, the method comprising: receiving a character string that identifies the communication device; searching a data structure having multiple nodes, wherein at least some of the nodes store a hash value; and identifying a property of the communication device, wherein the property is associated with a node identified by searching the data structure. Searching the data structure comprises iteratively performing the following operations for each of a plurality of nodes of the data structure: performing a hash function on a sequence of characters in the received character string to generate a hash value; comparing the generated hash value with the hash value stored by the node; and identifying a next node of the data structure to evaluate based on the result of the comparison.

Performing the hash function may comprise performing a rolling hash function on a plurality of sequences of characters in the received character string to generate a plurality of hash values, wherein each of the plurality of sequences of characters occurs at a different character position. Comparing the generated hash value may comprise comparing each of the plurality of generated hash values with the hash value stored by the node. At least one node of the data structure may store a plurality of hash values, and comparing the generated hash value may comprise comparing the generated hash value with each of the plurality of hash values stored by the node until a matching hash value is found or until the generated hash value has been compared with all of the plurality of hash values.

A further aspect of the present disclosure provides a computer program product or computer-readable medium comprising instructions which, when executed by a computer, cause the computer to perform any of the methods disclosed herein.

A further aspect of the present disclosure provides an apparatus configured to perform any of the methods disclosed herein.

A further aspect of the present disclosure provides a computer-readable medium comprising information for use in identifying a property of a communication device, the communication device being arranged to transmit a character string that identifies the communication device, the character string comprising a plurality of substrings, each substring comprising a sequence of characters, wherein the information comprises a data structure having multiple nodes, wherein: each of a plurality of nodes of the data structure stores a respective hash value, wherein each hash value corresponds to the hash value that would be generated by performing a hash function on the sequence of characters of each substring; the data structure comprises references between the plurality of nodes, wherein the references define a path through the data structure that identifies the communication device; and a node on the path is associated with a property of the communication device.

At least one of the plurality of nodes may be associated with a plurality of different substrings. The plurality of different substrings may include at least one of: different sequences of characters occurring at a common character position in the character strings of different communication devices; and different sequences of characters occurring at different character positions in the character strings of different communication devices. In this case, at least one of the plurality of nodes may store a plurality of hash values, each generated by performing the hash function on a respective one of the different sequences of characters. Alternatively or additionally, the plurality of different substrings may include at least one of: a common sequence of characters occurring at different character positions in the character strings of different communication devices; and different sequences of characters occurring at different character positions in the character strings of different communication devices. In this case, at least one of the plurality of nodes is associated with data indicating the different character positions at which each sequence of characters of the different substrings can occur in the character strings of different communication devices. The hash function may be a rolling hash function.

BRIEF DESCRIPTION OF THE DRAWINGS

Embodiments will now be described, purely by way of example, with reference to the accompanying drawings in which:

FIG. 5 shows a user interface used to create profiles for different components of a communication device;

FIG. 6 shows a user interface used to relate profiles to User-Agents via RegExs;

DETAILED DESCRIPTION

Disclosed herein are interrelated methods and apparatuses that enable the properties of a communication device to be identified. Firstly, there is a method and apparatus for generating information for use in identifying the properties of a communication device. Secondly, there is a method and apparatus for identifying the properties of a communication device based on the previously-generated information.

Figure 1:
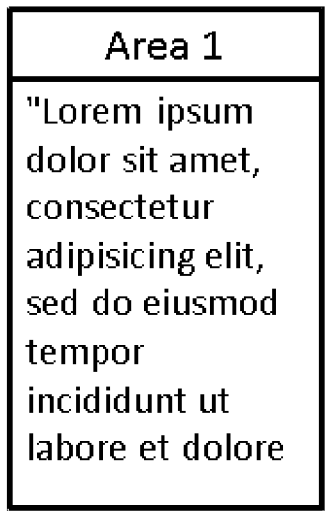
FIG. 1 shows an example of a web page formatted for a mobile phone screen.
Figure 2:
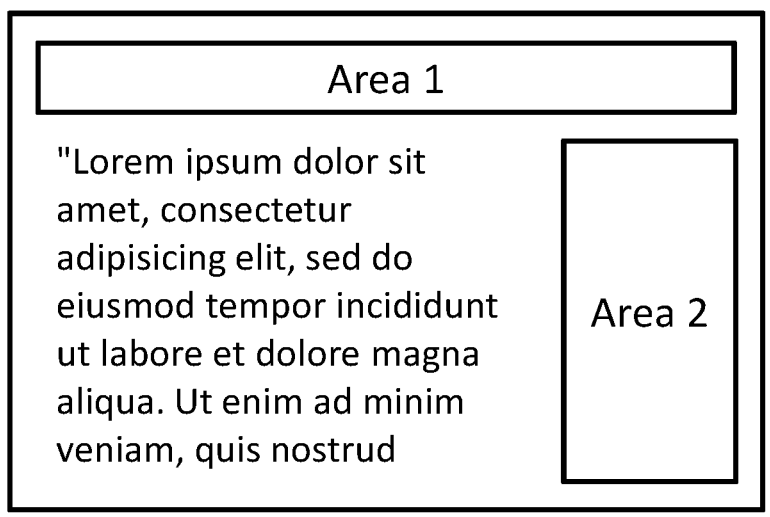
FIG. 2 shows an example of a web page formatted for a desktop screen.
Figure 3:
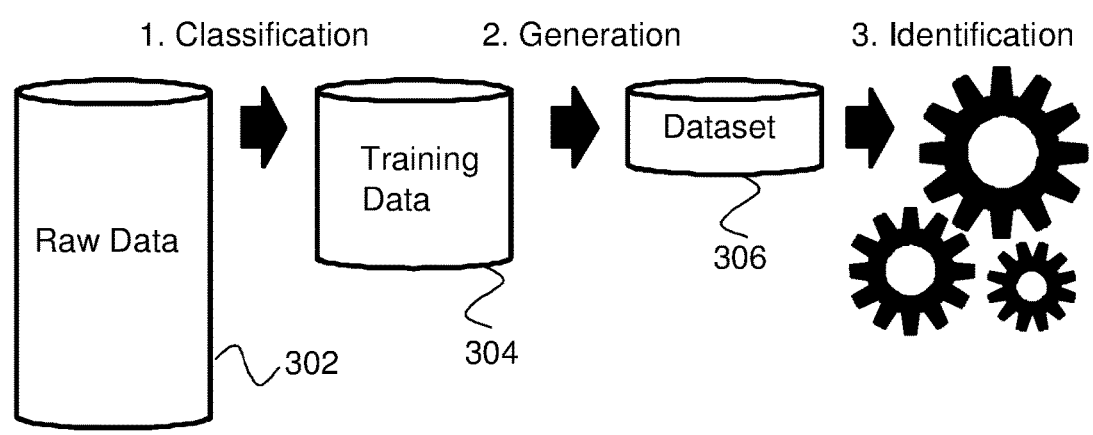
FIG. 3 is a flow diagram of the Classification, Generation and Identification processes described herein.

The relationship between these methods is illustrated by the flow diagram of FIG. 3. The initial input to these methods is raw data 302. The raw data 302 includes information about the characteristics of all possible hardware, operating systems and web browsers and their related User-Agents.

The raw data 302 is processed to form training data 304, in a process that is referred to herein as "Classification". The training data 304 is then converted into a dataset 306, in a process that is referred to herein as "Generation". The dataset 306 can then be deployed to a remote service, such as a web site. The remote service can use the dataset 306 to identify the properties of communication devices, in a process that is referred to herein as "Identification". In the following description, a communication device whose properties are to be determined by the Identification process is referred to as a "target device".

The structure of the dataset 306 will first be described. The Classification, Generation and Identification processes will then be described in turn.

Dataset

Figure 4:
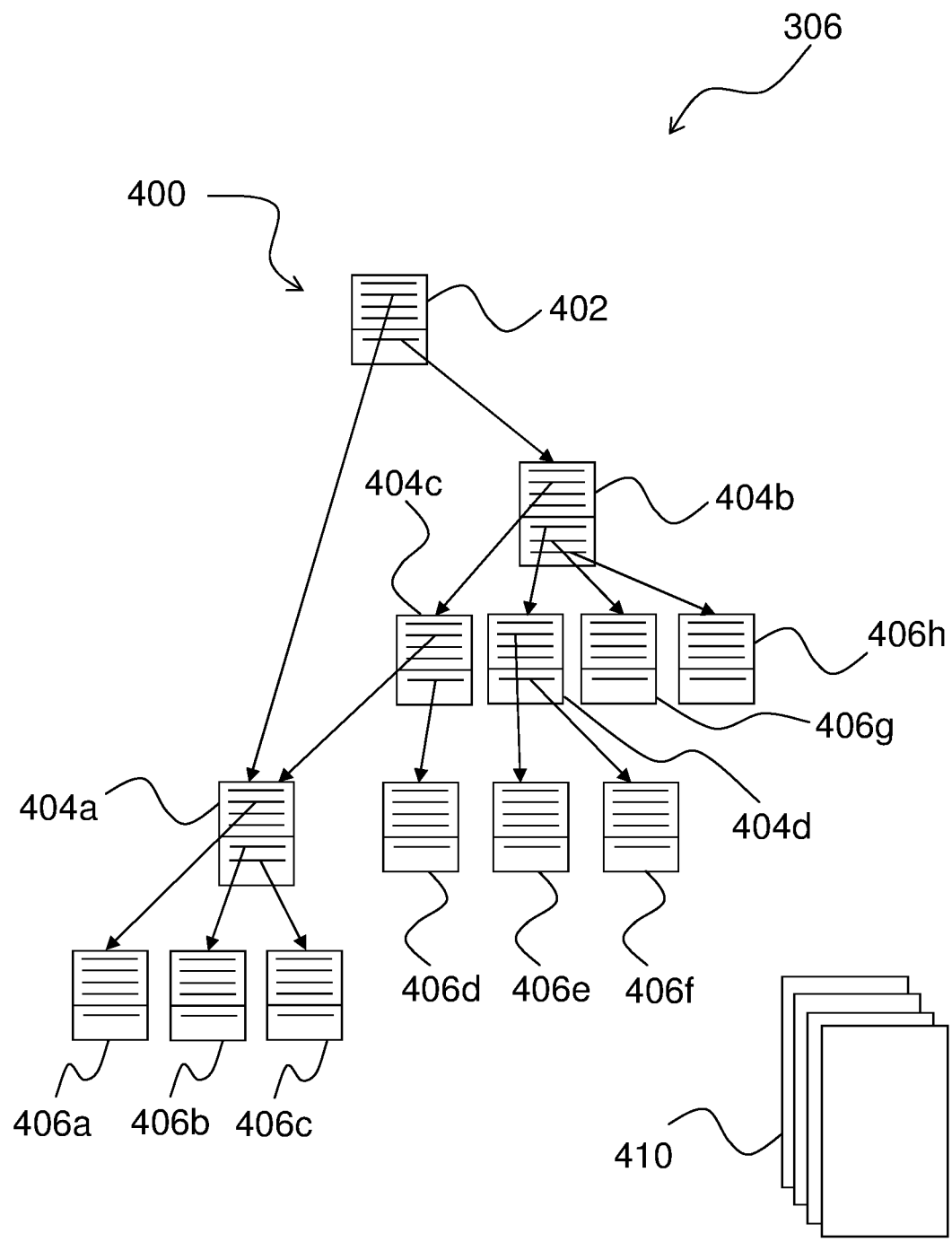
FIG. 4 is a schematic diagram of a dataset for use in identifying a property of a communication device.

FIG. 4 is a schematic diagram of the dataset 306. The dataset 306 comprises a data structure 400. The dataset 306 may optionally comprise values of the properties of each of a plurality of communication devices. For example, the dataset 306 may comprise a plurality of profiles 410, which contain values of related properties of one or more communication devices. Profiles 410 are described in more detail below, in relation to the Classification process.

The data structure 400 comprises a plurality of nodes. More specifically, the data structure 400 comprises a root node 402 and a plurality of leaf nodes 406. The data structure 400 may further comprise one or more branch nodes 404. A node may represent one or more substrings that occur within the User-Agent of a communication device. As explained in more detail in relation to step 704 of the method illustrated in FIG. 7, a substring is a sequence of consecutive characters that occurs at a particular character position within a User-Agent. A substring is said to occur at a particular character position if it begins at that character position or, alternatively, if it ends at that character position.

The root node 402 includes a reference to one or more branch nodes 404 and/or one or more leaf nodes 406. Each branch node 404 includes a reference to one or more further branch nodes 404 and/or one or more leaf nodes 406. The leaf nodes 406 do not include a reference to any other nodes. Each branch node 404 has one or more parent nodes. The references between nodes thus define a path through the data structure 400, where the path starts at the root node 402 and ends at a leaf node 406.

For example, in FIG. 4, the root node 402 includes a reference to branch nodes 404a and 404b. Branch node 404a includes a reference to leaf nodes 406a, 406b and 406c. Branch node 404b includes a reference to branch nodes 404c and 404d, and a reference to leaf nodes 406g and 406h. Branch node 404c includes a reference to branch node 404a and leaf node 406d. Branch node 404d includes a reference to leaf nodes 406e and 406f. Note that branch node 404a has two parent nodes, i.e. the root node 402 and branch node 404c.

In simple terms, the data structure 400 can be thought of as being a tree. However, due to the possibility that a branch node 404 may have a plurality of parent nodes, the data structure 400 can be described in more general terms as a directed acyclic graph.

For the sake of simplicity, the following discussion assumes that the data structure 400 has only one root node 402. However, the data structure 400 may comprise a plurality of root nodes 402. The following discussion also assumes that the data structure 400 comprises a plurality of branch nodes 404. However, it is possible for the data structure 400 not to have any branch nodes 404, such that the (or each) root node 402 directly references a leaf node 406. It is possible for a leaf node 406 to have a plurality of parent nodes, although the existence of a plurality of paths to a particular leaf node 406 implies that the data structure 400 contains a redundant path that could be eliminated to reduce the size of the data structure 400.

An example implementation of the data structure 400 will now be described with reference to Tables 2 and 3. In this example implementation, a node can be formed by appending zero or more records to a header. Each non-leaf node has one or more records, whilst each leaf node has no records. The header comprises a plurality of fields, each of which has a respective value. The header fields are summarised below in Table 2.

TABLE 2

| Header Field Name | Description |
|---|---|
| Unmatched Node | If the node is the root node or a branch node, this field contains a reference to another node in the data structure (which is referred to herein as the "Unmatched Node" for ease of explanation). This reference is used when the hash value of a substring of a target device is not equal to the value of any of the "Hash" fields (see Table 3) of the current node. For example, the reference may be a pointer to a memory location containing the Unmatched Node, or an index of an element of an array containing the Unmatched Node.<br>If the node is a leaf node, this field contains a negative value (e.g., −1). |
| First Index | If the node is the root node or a branch node, this field contains the first character position at which a substring associated with the Unmatched Node can begin.<br>If the node is a leaf node, or if the Unmatched Node is a leaf node, this field has no defined value. |
| Last Index | If the node is the root node or a branch node, this field contains the final character position at which a substring associated with the Unmatched Node can begin. The "First Index" and "Last Index" fields of the header collectively define a range of character positions at which substrings represented by the Unmatched Node can begin. The values of the "First Index" and "Last Index" fields may be equal, as explained below.<br>If the node is a leaf node, or if the Unmatched Node is a leaf node, this field has no defined value. |
| Device | If the node is a leaf node, this field contains the unique identifier of a device. For example, the unique identifier may specify an element in an array of devices that can be used to obtain the properties of the device.<br>If the node is not a leaf node, this field has no defined value. |
| Length | The number of characters in the substring(s) associated with the node. All substrings associated with the node have the same number of characters. |
| Number of Records | The number of records that the node comprises. If the node is the root node or a branch node, the number of records is one or more. |

Each record comprises a plurality of fields, each of which has a respective value. Each record represents a different substring. The record fields are summarised below in Table 3.

TABLE 3

| Record Field Name | Description |
|---|---|
| Hash | A hash value (also known as a hash code) generated by performing a hash function on the sequence of characters of the substring that is represented by the record. As described below, this hash value is compared with the hash value calculated from the corresponding characters of the User-Agent of a target device. |
| Matched Node | A reference to another node in the data structure (which is referred to herein as the "Matched Node" for ease of explanation). This reference is used when the hash of a substring of a target device is |

TABLE 3-continued

| Record Field Name | Description |
| --- | --- |
| | equal to the "Hash" field of the current record. For example, the reference may be a pointer to a memory location containing the Matched Node, or an index of an element of an array containing the Matched Node. |
| First Index | This field usually contains the first character position at which a substring associated with the Matched Node can begin. However, if the Matched Node is a leaf node, this field has no defined value. |
| Last Index | This field usually contains the final character position at which a substring associated with the Matched Node can begin. However, if the Matched Node is a leaf node, this field has no defined value. The "First Index" and "Last Index" fields of each record collectively define a range of character positions at which substrings represented by the Matched Node can begin. The values of the "First Index" and "Last Index" fields may be equal, as explained below. |

Non-leaf nodes cause the data structure 400 to be split into two or more branches. The number of branches into which the data structure 400 is split corresponds to the number of records in the node. That is, a node having n records splits the data structure into (n+1) branches. Branches 1 to n are identified using the "Matched Node" fields of the node's records. Branch (n+1) is identified using the "Unmatched Node" field of the node's header.

For example, node 402 in FIG. 4 has a single record, and splits the tree into two branches. The first branch comprises node 404b, and the second branch comprises node 404a. The first branch is identified using the "Matched Node" field of node 402, which refers to node 404b. The second branch is identified using the "Unmatched Node" field of node 402, which refers to node 404a. Node 404b has three records, and splits the tree into four branches. The first three branches are identified using the "Matched Node" fields of node 404b, which refer to nodes 404d, 406g and 406h. The fourth branch is identified using the "Unmatched Node" field of node 404b, which refers to node 404c.

In this example implementation, each non-leaf node represents one or more substrings that can occur within the User-Agent of a communication device. Each substring comprises a string of characters, which is stored as a hash value in the node. More specifically, a hash function is performed upon the sequence of characters, and the resulting hash value is stored in the "Hash" field of a record of the node. Any suitable hash function can be used. However, the amount of computation required to search the data structure 400 can be reduced by using a rolling hash function.

A rolling hash function is a type of hash function that operates upon a moving window in a string of characters, such that the hash value at the current position of the window can be used to calculate the hash value at the next position of the window. For example, given the hash value at the current position of the window, the hash value at the next position of the window can be calculated simply by subtracting a value related to the character that is removed by moving the window, and by adding a value related to the character that is included by moving the window. A rolling hash function thus allows the hash values of multiple adjacent substrings to be calculated more quickly than if the same number of hash values were each to be calculated from scratch. The Rabin-Karp rolling hash function is an example of a rolling hash function that may be used to implement the present disclosure. The Rabin-Karp rolling hash function is described in Karp, R. M., and Rabin, M. O., "*Efficient Randomized Pattern Matching Algorithms*" (IBM Journal of Research and Development, Vol. 31, No. 2, March 1987, pages 249-260), the entire content of which is incorporated by reference herein. Other suitable rolling hash functions could be used.

The data structure 400 is searched, starting at the root node 402 and working towards a leaf node 406, by calculating hash values for different substrings of the User-Agent of a target device. The path that is followed through the data structure 400 will be dependent upon whether the hash value of a particular substring of the User-Agent is equal to the value of any of the "Hash" fields of a particular node. That is, when the hash value of a substring of a target device is equal to a value contained in the "Hash" field of one of the node's records, the "Matched Node" field of that record indicates the next node to be evaluated. Alternatively, when the hash value of the sub string of the target device is not equal to any of the values contained in the "Hash" fields of the node's records, the "Unmatched Node" field of the node's header indicates the next node to be evaluated.

The target device is deemed to be identified when a leaf node 406 is reached. Properties of the target device can then be retrieved using the device identifier contained in the "Device" field of the leaf node 406. For example, a value of a property of the target device can be retrieved from a profile 410 that is associated with the device identifier.

Searching the data structure 400 does not always result in a device being positively identified. A target device can be sometimes identified by what its User-Agent does not contain, not just what it does contain. For example, consider one device whose User-Agent contains "iPhone 6", and another device whose User-Agent contains "iPhone 7". Assuming for simplicity that these are the only two devices whose User-Agents contain "iPhone", the data structure 400 could have a first branch node 404b that represents the substring "iPhone". The first branch node 404b could reference a second branch node 404d. The second branch node 404d could have two leaf nodes 406e and 406f, one for each of the aforementioned devices. One possible way of identifying the two devices would be to configure the second branch node 404d to represent the substring "7" (e.g. by storing the hash value of the substring "7" in the "Hash" field of node 404d's single record). In this case, matching would identify the device whose User-Agent contains "iPhone 7" by moving to the leaf node 406f to which the "Matched Node" field of node 404d refers. On the other hand, not matching would identify the device whose User-Agent contains "iPhone 6" by moving to the leaf node 406e to which the "Unmatched Node" field of node 404d refers. This method of ruling out possible devices can be used to allow a good match to be found for newly-released communication devices whose User-Agents were unknown when the data structure 400 was created. Extending the previous example, a future version of the "iPhone 7" device may have a User-Agent that contains "iPhone 7s"; advantageously, this future device would be matched as the "iPhone 7" device, which would likely give a good approximation of the properties of this hitherto unknown device.

Extending this example even further to accommodate future devices whose User-Agents contain "iPhone 8" or "iPhone 9", for example, a generic iPhone profile 410 can be created for devices whose User-Agents contain "iPhone". In this case, the data structure 400 could be built such that after the substring "iPhone" was matched at the first branch node 404b, the substrings "6" and "7" (and any other possible additions) would fail to match. The "Unmatched Node" field of the second branch node 404d could refer to a leaf node 406e whose "Device" field refers to the generic iPhone profile. In this manner, the data structure 400 can advantageously allow the identification of suitable properties for an unknown device.

Each substring is defined not only by its sequence of characters, but is also defined by the position at which it occurs in the User-Agent. The character position of a substring represented by any node (other than the root node 402) is stored using the "First Index" and "Last Index" fields of that node's parent node. More specifically, when a node is a Matched Node, the character position of the substring is stored using the "First Index" and "Last Index" fields of the appropriate record of its parent node. When a node is an Unmatched Node, the character position of the substring is stored using the "First Index" and "Last Index" fields in the header of its parent node.

The root node 402 does not have a parent node. Hence, the character position of a substring represented by the root node 402 cannot be stored in a parent node. The character position of a substring represented by the root node 402 may be stored elsewhere in the dataset 306 and/or may be supplied as an input parameter to an algorithm for searching the data structure 400.

If a particular sequence of characters can occur only at a single character position, the values of the "First Index" and "Last Index" fields are both equal to that character position. On the other hand, if a particular sequence of characters can occur at several consecutive character positions, the value of the "First Index" field is equal to the first character position at which it can occur, whilst the value of the "Last Index" field is equal to the last character position at which it can occur.

Any node (other than the root node 402) can have more than one parent node. Hence, by storing the character position at which a substring can occur in a node's parent node, a node is able to represent a sequence of characters that can occur at several non-consecutive character positions. For example, and with reference to FIG. 4, the "First Index" and "Last Index" fields of node 402 can indicate a first character position (or a first range of consecutive character positions) at which the substring represented by node 404a can occur. The "First Index" and "Last Index" fields of node 404c can indicate a second character position (or a second range of consecutive character positions) at which the substring represented by node 404a can occur. By creating appropriate references from one or more parent nodes to a single child node, and by selecting appropriate values of the "First Index" and "Last Index" fields of the parent nodes, it is possible for the child node to represent a sequence of characters that can occur at any number of character positions within a User-Agent. This can help to reduce the size of the data structure 400, by avoiding the need for multiple nodes to represent the same sequence of characters occurring at different character positions.

The values of the "First Index" and/or the "Last Index" fields may be expressed as character positions counted relative to the last evaluated character position. Referring again to FIG. 4, consider an example in which node 404b represents a sequence of characters that occurs at character position 50. If node 402 represents a substring that occurs at character position 0, then the "First Index" and "Last Index" fields of node 402 would each have a value of +50. In this example, the value of +50 is the difference between the character position represented by node 404b (i.e. position 50) and the character position represented by node 402 (i.e. position 0). Continuing this example, suppose that node 404d represents a sequence of characters that can occur between character positions 10 and 20. The "First Index" field in one record of node 404b would have a value of −40, since this is the difference between the first character position represented by node 404d (i.e. position 10) and the character position represented by node 404b (i.e. position 50). The "Last Index" field in that record of node 404b would have a value of −30, since this is the difference between the last character position represented by node 404d (i.e. position 20) and the character position represented by node 404b (i.e. position 50). Expressing the values of the "First Index" and/or the "Last Index" fields as a number of character positions counted relative to the last evaluated character position provides a simple and consistent way for a node to represent a sequence of characters that can occur at any number of character positions within a User-Agent.

The "First Index", "Last Index" and "Length" fields collectively indicate one or more substrings, in the User-Agent of a target device, upon which a hash function is to be performed. A first hash value is generated by performing a hash function on a sequence of characters that begins at the character position indicated by the value of the "First Index" field of the parent node. The length of the sequence of characters upon which the hash function is performed is indicated by the value of the "Length" field of the current node. When the value of the "Last Index" field is equal to the value of the "First Index" field, a hash function is performed on only one substring in the User-Agent of the target device. However, when the value of the "Last Index" field is different from the value of the "First Index" field, a hash function is performed on multiple substrings in the User-Agent of the target device. More specifically, multiple hash values are generated by performing a hash function on each sequence of characters that begins at each character position within the range indicated by the values of the "First Index" and "Last Index" fields. As before, the length of each sequence of characters upon which the hash function is performed is indicated by the value of the "Length" field.

The order in which the character positions are to be evaluated when calculating the hash value may be indicated by whether the "Last Index" is greater than or less than the "First Index". For example, if the value of the "Last Index" field is less than the value of the "First Index" field, the rolling hash value is calculated using a window that moves from right to left (i.e. towards character position zero). Conversely, if the value of the "Last Index" is greater than the value of the "First Index", the rolling hash function is calculated using a window that moves from left to right (i.e. away from character position zero).

All nodes may have the same format, comprising a header and one or more records as described above with reference to Tables 2 and 3. Use of the same format can allow new nodes to be quickly and easily added to an existing data structure 400. This can be useful when the data structure 400 needs to be updated quickly to allow a newly-released communication device to be identified. However, the scope of the claims is not limited to nodes having the specific format described above. Indeed, it will be appreciated that equivalent functionality can be achieved with nodes having other formats than those described above, and such equivalents should be regarded as being within the scope of the claims. For example, in another possible implementation of the data structure 400, all nodes (not just non-leaf nodes) can be associated with one or more substrings. In another possible implementation of the data structure 400, any node (not just leaf node) can be associated with a device. In yet another possible implementation of the data structure 400, the character position of a substring can be represented using the "First Index" and "Last Index" of the node itself (rather than using the "First Index" and "Last Index" fields of the parent node). In this implementation, the values of the "First Index" and/or the "Last Index" fields may be counted from the first character position of a User-Agent (rather than relative to the last evaluated character position).

The data structure 400 described herein can represent a given number of User-Agents using less memory or disk space than the tries that are conventionally used to identify communication devices. One reason for the smaller size is that the data structure 400 stores a hash value of a substring, rather than the substring itself. For example, assume that the hash value is an unsigned 32-bit integer and that each character of the substring is an 8-bit integer (or byte). In this example, storing a hash value requires less space than storing a substring having five or more characters.

Another reason for the smaller size is that the data structure 400 can avoid redundancy when two or more User-Agents include a common sequence of characters that begins at a different character position in each User-Agent. A trie would store the common sequence of characters several times. That is, the trie would store a separate copy of the common sequence of characters at every character position. In contrast, the data structure 400 can store the hash value of the common sequence of characters just once, and can represent the different character positions of the sequence of characters using the "First Index" and "Last Index" values. This can avoid the storage of redundant characters that arises when, for example, the same version of a web browser is executed on several different models of device manufactured by many different vendors.

A further reason for the smaller size is that, unlike a trie, the data structure 400 does not need to store every character of every User-Agent in the training data 304. Instead, the data structure 400 can store the hash values of a minimal set of substrings that allows each device to be uniquely identified. Each substring in the minimal set is disjoint from (and may be non-consecutive with respect to) the other substrings in the minimal set. In this manner, the data structure 400 can avoid storing characters and/or substrings that do not differentiate between devices.

The data structure 400 described herein can also allow a communication device to be identified more quickly than a conventional trie-based algorithm. As mentioned in the previous paragraph, the data structure 400 does not need to store every character of every User-Agent in the training data 304, but can instead store the hash values of a minimal set of substrings that allows each device to be uniquely identified. A target device can thus be identified by matching the hash values of a few substrings of its User-Agent to the hash values of the minimal set of substrings stored in the data structure 400, which may often be quicker than searching for a long sequence of characters in a trie.

Furthermore, by avoiding the need to store every character of every User-Agent in the training data 304, the data structure 400 can allow devices to be identified more accurately than is possible with a trie. User-Agents sometimes contain characters that are irrelevant to the properties of the target device. For example, a User-Agent may contain a sequence of characters that identifies a person using the device, but does not contain any information about the device itself. Such irrelevant characters would need to be included in a trie, which would either result in devices being incorrectly identified, or necessitate the inclusion of every possible sequence of characters used to identify a person, thus reducing the accuracy and/or increasing the size of the resulting trie. However, the data structure 400 allows storing those irrelevant characters to be avoided, thereby allowing devices to be identified more accurately.

The data structure 400 described herein can allow specific properties of a target device to be retrieved more quickly than is possible with a conventional trie-based algorithm. As mentioned above, the data structure can have a plurality of root nodes 402. Each of the plurality of root nodes 402 can be used to retrieve different properties of the target device. For example, a first root node 402 may be used to retrieve properties relating to the hardware of a communication device, a second root node 402 may be used to retrieve properties relating to the browser running on a communication device, and/or a third root node 402 may be used to retrieve properties relating to the operating system used by a communication device. Further root nodes 402 may be created to allow other types of properties to be retrieved. The provision of multiple root nodes 402 can thus allow specific properties to be retrieved without searching the entire data structure 400. In contrast, conventional trie-based algorithms typically require at least a significant portion of the target-device's User-Agent to be compared against the trie before any properties can be returned.

Classification

The purpose of the Classification process is to associate each User-Agent in the raw data 302 with the properties of a particular device that transmits the User-Agent in question. The Classification process may be substantially the same as that disclosed in the applicant's earlier patent, European Patent No. 2 871 816, but is described below to assist the reader in understanding the Generation and Identification processes disclosed herein. The skilled person will appreciate that the Classification process can be implemented in other ways.

Every device using HTTP communications can be considered to have three components, namely a hardware component, an operating system component and a browser component. Over time other components may be required, or current ones may become obsolete. Example components are shown in Table 4.

TABLE 4

| ID | Component Type | Description |
|---|---|---|
| C1 | Hardware | A collection of properties associated with the device hardware. For example, physical screen size, input methods, manufacturer. |

TABLE 4-continued

| ID | Component Type | Description |
|---|---|---|
| C2 | Operating System | A collection of properties associated with the device's operating system. For example, version, supported executable formats, or manufacturer. |
| C3 | Browser | A collection of properties associated with the device's web browser. For example, supported HTML5 elements, supported image, audio and video formats. |

Each component is associated with one or more profiles. A profile groups together related characteristics of a component. Example profiles are shown in Table 5, Table 6 and Table 7. Specifically, Table 5 shows examples of hardware profiles that group together characterises of a hardware component, Table 6 shows examples of operating system profiles that group together characteristics of an operating system component, and Table 7 shows examples of browser profiles that group together characteristics of a browser component.

TABLE 5

| ID | C1-Hardware Profiles |
|---|---|
| H1 | Apple iPhone 5 |
| H2 | Apple iPhone 5s |
| H3 | Samsung Galaxy S5 |
| H4 | Samsung Galaxy J3 |
| H5 | Samsung Galaxy Sol |
| H6 | LG Phoenix 2 |
| H7 | Unknown Desktop |
| H8 | Unknown |

TABLE 6

| ID | C2-Operating System Profiles |
|---|---|
| O1 | iOS version 9 |
| O2 | iOS version 10 |
| O3 | Android 5 |
| O4 | Android 6 |
| O5 | Windows Phone 8 |
| O6 | Windows 10 Mobile |
| O7 | Windows 8 |
| O8 | Unknown |

TABLE 7

| ID | C3-Browser Profiles |
|---|---|
| B1 | Mobile Safari |
| B2 | Android Browser |
| B3 | Samsung Browser |
| B4 | Facebook |
| B5 | Internet Explorer |
| B6 | Chrome Mobile |
| B7 | Chrome Desktop |
| B8 | Spider/Crawler |

Each profile includes one or more properties. For example, a device's physical screen size, CPU, hardware vendor and model name are properties related to the hardware component. An operating system component may include properties such as information about the manufacturer, the version, when it was released and the Application Programming Interfaces (APIs) it makes available. Table 8 shows examples of hardware vendors.

TABLE 8

| ID | Value |
|---|---|
| V1 | Samsung |
| V2 | Nokia |
| V3 | LG |
| V4 | Apple |

Many of these values will be repeated across multiple profiles. For example, Samsung manufacture many different devices. Rather than duplicating the value "Samsung" multiple times for each profile, the profile can reference a unique ID for the value. Table 9 shows some example hardware property values assigned to profiles H3 and H4. Notice how value ID V1 relates to both profiles.

TABLE 9

| ID | Property | Value | Profile ID |
|---|---|---|---|
| V10 | CPU | 2.5 Ghz Quad-core | H3 |
| V9 | ScreenDiagonalInches | 5.1 | H3 |
| V8 | HardwareModel | Galaxy S5 | H3 |
| V1 | HardwareVendor | Samsung | H3 |
| V7 | CPU | 1.5 Ghz Quad-core | H4 |
| V6 | ScreenDiagonalInches | 5.0 | H4 |
| V5 | HardwareModel | Galaxy J3 | H4 |
| V1 | HardwareVendor | Samsung | H4 |

FIG. 5 shows an example of a user interface to enable a human operator to populate profile data based on sources including manufacturers' specifications and automated device tests. The user interface allows values to be selected from predetermined lists, thus increasing data consistency by reducing the probability of operator error.

In order to relate profiles to User-Agents, each profile has one or more RegExs assigned to it by a human operator. For each new User-Agent being added to the training data, the RegExs for all of the profiles for each component are evaluated. If a single profile matches the User-Agent being added, that User-Agent can be automatically related to the profile. Table 10 shows an example of related profiles and User-Agents assigned in this manner.

TABLE 10

| ID | User-Agent Example | Matching Profiles | Matched RegExs |
|---|---|---|---|
| U1 | Mozilla/5.0 (iPhone; CPU iPhone OS 10_2 like Mac OS X) | H2-O2-B4 | H-Contains "iPhone6" O-Contains "iPhone OS 10" |

TABLE 10-continued

| ID | User-Agent Example | Matching Profiles | Matched RegExs |
|---|---|---|---|
| | AppleWebKit/602.3.12 (KHTML, like Gecko) Mobile/14C92 [FBAN/FBIOS; FBAV/75.0.0.48.61; FBBV/45926345; FBRV/0; FBDV/iPhone6,2; FBMD/iPhone; FBSN/iOS; FBSV/10.2; FBSS/2; FBCR/BouyguesTelecom; FBID/phone; FBLC/fr_FR;FBOP/5] | | B-Contains "FBAN" |
| U2 | Mozilla/5.0 (Linux; Android 6.0.1; SM-G900R4 Build/MMB29M) AppleWebKit/537.36 (KHTML, like Gecko) Chrome/55.0.2883.91 Mobile Safari/537.36 | H3-O4-B6 | H-Contains "SM-G900R4" O-Contains "Android 6" B-Contains "Chrome/" followed by "Mobile" |
| U3 | Mozilla/5.0 (compatible; Googlebot/2.1; +http://www.google.com/bot.html) | H8-O8-B8 | H-Does not match any other Hardware profile O-Does not match any other OS profile B-Contains "Googlebot" |
| U4 | Mozilla/5.0 (Linux; Android 6.0; LG-K371 Build/MRA58K) AppleWebKit/537.36 (KHTML, like Gecko) Chrome/52.0.2743.98 Mobile Safari/537.36 | H6-O4-B6 | H-Contains "LG-K371" O-Contains "Android 6" B-Contains "Chrome/" followed by "Mobile" |
| U5 | Mozilla/5.0 (Linux; Android 5.1.1; SAMSUNG SM-J320FN Build/LMY47V) AppleWebKit/537.36 (KHTML, like Gecko) SamsungBrowser/3.5 Chrome/38.0.2125.102 Mobile Safari/537.36 | H4-O3-B3 | H-Contains "SM-J320FN" O-Contains "Android 5" B-Contains "SamsungBrowser" |
| U6 | Mozilla/5.0 (Linux; Android 6.0.1; SAMSUNG-SM-J321AZ Build/MMB29K) AppleWebKit/537.36 (KHTML, like Gecko) SamsungBrowser/4.0 Chrome/44.0.2403.133 Mobile Safari/537.36 | H5-O4-B3 | H-Contains "SM-J321AZ" O-Contains "Android 6" B-Contains "SamsungBrowser" |

If no profiles match, or more than one profile matches, then the human operator can be informed. The operator can decide which of the possible profiles to assign the user agent to, or create a new profile if one did not exist already. Additional information may be required from the manufacturer in order to complete the final assignment.

FIG. 6 shows a user interface to control the RegExs related to a specific profile, and the User-Agents related to that profile. RegExs can be created and edited for the profile. The RegExs can then be applied to the possible User-Agents and any that match uniquely assigned to the profile forming a relationship between the Profile and the User-Agent.

The User-Agents and their associated profiles may optionally be filtered, so as to remove User-Agents and profiles for devices that are less frequently used to access web sites. A suitable filtering process is disclosed in the applicant's earlier patent, European Patent No. 2 871 816. The filtering process can reduce the size of the training data 304, which in turn reduces the size of the dataset 306 generated from the training data 304, thus allowing the dataset 306 to be deployed to websites with limited memory and/or disk storage. However, it will be appreciated that the filtering process may prevent correct properties being provided for devices whose profiles are removed from the dataset 306.

Generation

Figure 7:
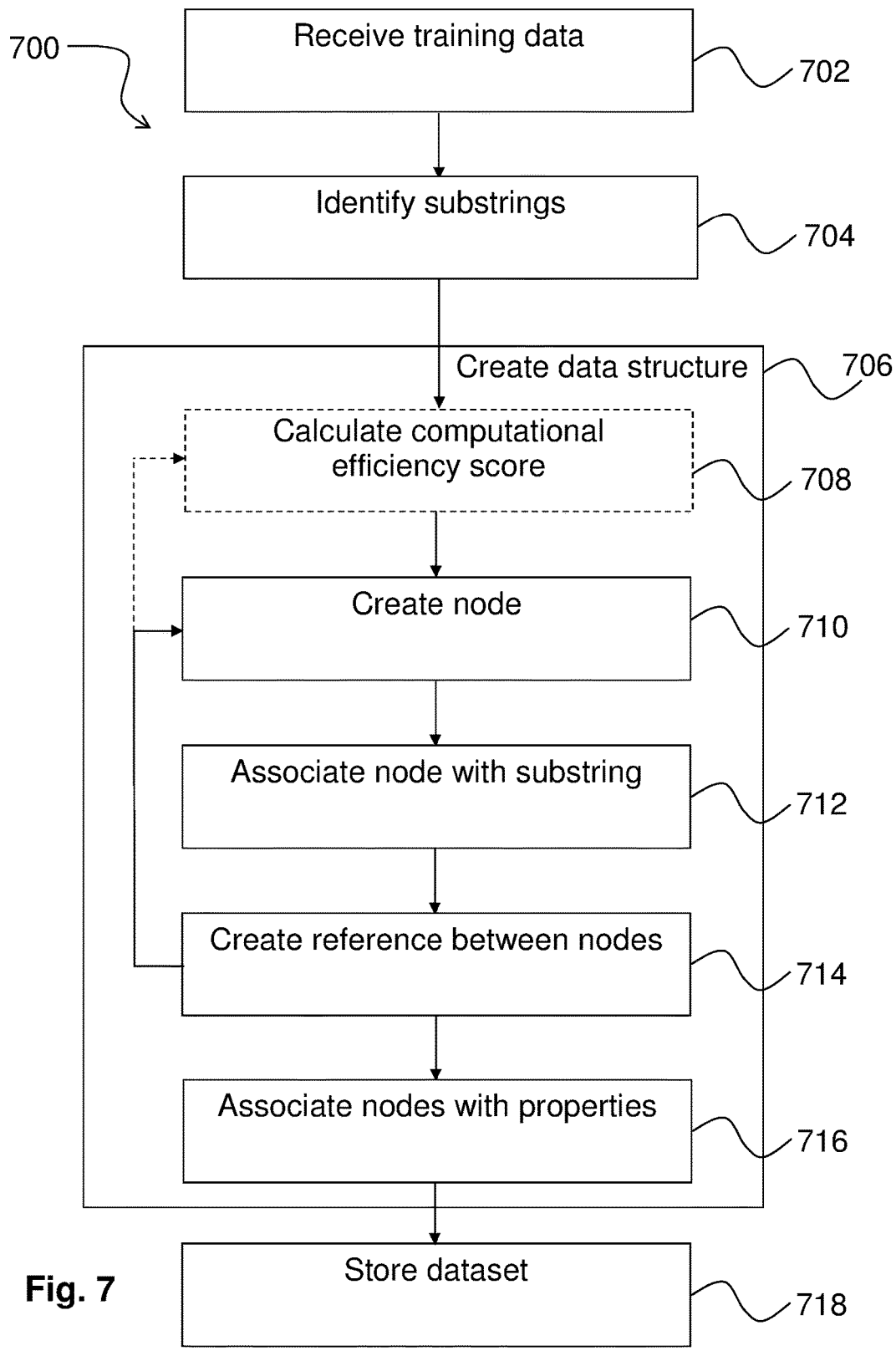
FIG. 7 is a flow diagram of a method of generating information for use in identifying a property of a communication device.

With the training data 304 populated with a set of User-Agents and profiles, a dataset 306 structured for rapid device identification can be generated. FIG. 7 is a flow diagram of a computer-implemented method 700 of generating such a dataset 306, which comprises information for use in identifying a property of a communication device. Broadly speaking, the method 700 converts the training data 304 into a form that allows the properties of communication devices to be quickly and accurately identified.

The method 700 begins at step 702, when training data 304 is received. As will be apparent from the foregoing description of the Classification process, the training data 304 comprises a plurality of User-Agents, each of which is associated with one or more properties of a device that transmits that User-Agent. For example, each User-Agent may be associated with a set of one or more profiles, as shown in Table 10.

The training data 304 need not contain every possible User-Agent that exists. Indeed, given that the number of User-Agents in existence grows daily, it is probable that the training data 304 will not contain every possible User-Agent that exists. However, the absence of User-Agents from the training data need not adversely affect the accuracy of the Identification process because, as will be explained in greater detail below, it is possible to identify devices accurately even if their User-Agent is not present in the data structure 400. Furthermore, the omission of User-Agents from the training data 304 may even improve the ability to identify new devices, by avoiding the data structure 400 being overfitted to the training data 304. Thus, the training data 304 generally contains a representative sample of User-Agents.

At step 704, each User-Agent in the training data 304 is processed to identify substrings that occur within the User-Agent. As used herein, the term "substring" refers to a sequence of consecutive characters that occurs at a particular character position within a User-Agent.

In an example, a substring is identified by reading a User-Agent to identify a sequence of characters that starts and ends with a delimiter. The delimiter can be any character (or sequence of characters) that divides a User-Agent into meaningful segments. Examples of single character delimiters include a space (" "), comma (","), semicolon (";"), left parenthesis ("(") and/or left square bracket ("["). An example of a multiple-character delimiter is a non-alphanumeric character that is immediately followed by an alphanumeric character (such as ".0", "/5" or "/M"). These are purely non-limiting examples of delimiters; alternative and/or additional delimiters can be used. Either or both of the delimiters may optionally be regarded as being part of a substring. To allow the first and last substrings of a User-Agent to be identified, the start and end of the User-Agent are also used as delimiters.

A substring may comprise one or more characters. However, longer substrings are more capable of differentiating between different devices than shorter substrings. Hence, in some examples in accordance with present disclosure, only character sequences that comprise more than a threshold number of characters are considered to be valid substrings. Character sequences with fewer characters than the threshold may be combined with the immediately preceding sequence of characters and/or the immediately succeeding sequence of characters to form a valid substring.

The process of identifying substrings also involves determining the character position at which each sequence of characters occurs. The character position at which each sequence of character occurs is helpful in distinguishing between different devices. For example, the occurrence of the character sequence "Chrome" towards the start of a User-Agent may signify that the device is an iPhone, whereas the occurrence of the character sequence "Chrome" towards the end of a User-Agent may signify an Android device. To take advantage of this property, identical sequences of characters that occur at different character positions are considered to be different substrings.

For the sake of consistency throughout the examples discussed below, the character position of a substring will be considered to be the position of the first character of that substring, counted from the first character (i.e. character position zero) of the User-Agent. However, it will be appreciated that the character position of a substring could be counted from the last character of a User-Agent, or could be counted relative to the character that was last evaluated in a User-Agent.

To illustrate step 704, Table 11 lists substrings that can be identified within the User-Agent "Mozilla/5.0 (Linux; Android 6.0.1; SM-G900R4 Build/MMB29M) AppleWebKit/537.36 (KHTML, like Gecko) Chrome/55.0.2883.91 Mobile Safari/537.36" using the exemplary delimiters listed above, and assuming that only substrings having five or more characters are regarded as valid substrings.

TABLE 11

| Identified Substring | | | |
|---|---|---|---|
| Character Sequence | Character Position | First Delimiter | Second Delimiter |
| Mozilla/5.0 | 0 | Start of User-Agent | " " (space) |
| Linux | 13 | "(" | ";" |
| Android | 20 | " " (space) | " " (space) |
| 6.0.1 | 28 | " " (space) | ";" |

TABLE 11-continued

| Identified Substring | | | |
|---|---|---|---|
| Character Sequence | Character Position | First Delimiter | Second Delimiter |
| SM-G900R4 | 35 | " " (space) | " " (space) |
| Build | 45 | " " (space) | "/M" |
| MMB29M) | 51 | "/M" (Note: part of the delimiter, "/M", is treated as part of the substring) | " " (space) |
| AppleWebKit | 59 | " " (space) | "/5" |
| 537.36 | 71 | "/5" | " " (space) |
| KHTML, like | 79 | "(" | " " (space) |
| Gecko) | 91 | " " (space) | " " (space) |
| Chrome | 98 | " " (space) | "/5" |
| 55.0.2883.91 | 105 | "/5" | " " (space) |
| Mobile | 118 | " " (space) | " " (space) |
| Safari | 125 | " " (space) | "/5" |
| 537.36 | 132 | "/5" | End of User-Agent |

In this example, certain sequences of characters (e.g., "/5" and ".0" in the substring "Mozilla/5.0", and ".0" and ".1" in the substring "6.0.1") include the exemplary multiple-character delimiter of a non-alphanumeric character that is immediately followed by an alphanumeric character. However, because these sequences of characters do not have the threshold number of characters needed to be regarded as valid substrings, they are combined with the immediately preceding sequence of characters to form a valid substring. For similar reasons, "KHTML," and "like" are combined to form a valid substring having more than the threshold number of characters. It can also be seen that the sequence of characters "537.36" occurs twice, at character positions 71 and 132. These identical sequences of characters are considered to be different substrings, due to their different character positions.

As can be seen from Table 11, delimiters provide a consistent way of automatically dividing a User-Agent into meaningful segments that can subsequently be used to identify devices. Other suitable methods of identifying substrings may be used, in addition or as an alternative to using delimiters, and such methods fall within the scope of the claims.

All substrings present within all User-Agents in the training data 304 are identified during step 704. Many substrings will occur in more than one User-Agent. For example, the substring consisting of the character sequence "Linux" starting at character position 13 occurs in User-Agent IDs U2, U4, U5 and U6 in Table 10.

Step 704 further includes associating each identified substring with an identifier of each device whose User-Agent includes that substring. For example, substrings and their corresponding device identifiers may be stored in a table or other suitable data structure, so as to represent the one-to-one and one-to-many mappings that can exist between substrings and devices. Any suitable device identifier may be used. For example, a device identifier may be formed by combining the identifiers of each of the profiles that were matched to the User-Agent for a device during the Classification process. For example, "H2-O2-B4" can be used as an identifier for the first device in Table 10 (i.e. the device with User-Agent ID U1). Alternatively, the device identifier may be a unique number or a unique alphanumeric string that is assigned to each device during the Classification process.

Table 12 gives an example of associations between substrings and device identifiers for each of the devices whose User-Agents are listed in Table 10. For the sake of simplicity, User-Agent IDs (i.e. U1 to U6) are used to identify each device in Table 12, but other types of device identifier are possible, as explained above. Table 12 does not include all of the possible substrings for all six devices, but merely includes a sample of substrings that is sufficient to illustrate the principles disclosed herein.

TABLE 12

Identified Substring

| Character Sequence | Character Position | Devices |
|---|---|---|
| Mozilla/5.0 | 0 | U1, U2, U3, U4, U5, U6 |
| iPhone | 13 | U1 |
| Linux | 13 | U2, U4, U5, U6 |
| Compatible | 13 | U3 |
| Android | 20 | U2, U4, U5, U6 |
| Android 6.0 | 20 | U4 |
| 6.0.1 | 28 | U2, U6 |
| 5.1.1 | 28 | U5 |
| LG-K371 | 33 | U4 |
| SM-G900R4 | 35 | U2 |
| SAMSUNG | 35 | U5, U6 |
| SAMSUNG-SM-J321AZ | 35 | U6 |
| Build | 41 | U4 |
| Build | 45 | U2 |
| Build | 53 | U5, U6 |

Once all of the substrings in the training data 304 have been identified and associated with one or more device identifiers, the method proceeds to step 706.

In step 706, a data structure 400 as described above is created. Step 706 may optionally include a step 708 of calculating a computational efficiency score for the substrings. Step 706 includes a step 710 of creating a node of the data structure 400, a step 712 of associating the newly-created node with a substring, a step 714 of creating a reference between nodes, and a step 716 of associating a node 406 of the data structure 400 with a property of a communication device.

At step 708, one or more computational efficiency scores are calculated for each of the substrings identified in step 704. Generally speaking, a computational efficiency score is a measure of the extent to which the data structure 400 is optimised by associating a particular substring, or a particular set of substrings, with a particular node. Computational efficiency scores can quantify various aspects of the performance of the data structure 400, such as the average number of processing operations required to identify a target device, the average time taken to identify a target device, the amount of storage required by the data structure 400 and/or the accuracy of the data structure 400. Calculating computational efficiency scores thus allows the data structure 400 to be created in a way that optimises one or more aspects of the performance of the data structure 400. By optimising the data structure 400, an identification process that uses the data structure 400 can also be optimised.

Equation (1) is an example of a computational efficiency score:

$$Score = \frac{\frac{D_{Total}}{D_{Max}}\left(1 - \left|\frac{1}{N_{SubBranches}} - \frac{D_{Max}}{D_{Total}}\right|\right)}{N_{Operations}} \quad (1)$$

where Score is the computational efficiency score, $|x|$ represents the absolute value (modulus) of x, $N_{SubBranches}$ is the number of branches of the current node, $D_{Max}$ is the number of devices that will be put into the largest subtree of the current node (where "largest" is defined by the number of devices in the subtree), $D_{Total}$ is the total number of devices that exist below the current node, and $N_{Operations}$ represents the number of operations needed to search for the hash value of a substring within the current node.

The numerator of Equation (1) represents how effectively the data structure would be split into a plurality of branches that each have an equal number of leaf nodes. In the case of a node with n branches, the maximum value of the numerator will occur when each branch of the node contains 1/n of the total number of devices that exist below the node.

The denominator of Equation (1) represents the computational cost of evaluating the node. This can be calculated by summing the number of CPU operations needed to calculate the hash value of a substring and the number of CPU operations needed to compare the hash value to each of the "Hash" fields in the node.

The example computational efficiency of Equation (1) thus gives consideration to three factors that reflect how the node influences the performance of the data structure: the percentage of devices ruled out by evaluating the node; how balanced the node is; and how many CPU operations are required to evaluate the node.

Therefore, an optimal node would be chosen to be one which discarded a large portion of non-matching devices $$\left(\text{large } \frac{D_{Total}}{D_{Max}}\right),$$

kept the tree balanced $$\left(\frac{1}{N_{SubBranches}} = \frac{D_{Max}}{D_{Total}}\right)$$

and required a small number of operations to evaluate the node (small $N_{Operations}$).

To illustrate how the computational efficiency score of Equation (1) can be used, consider an example in which the effect of associating a node with the substring "5.1.1" (see Table 12) is assessed. In this example, the following assumptions are made:

1. the node is a root node, i.e. all six devices shown in Table 10 are to be included in child subtrees;
2. calculating a hash value requires one operation for each character of the substring;
3. shifting a hash value of a rolling hash function (i.e. moving the window by one character position) requires one operation; and
4. a hash comparison requires one operation.

In this example, a computational efficiency score is first calculated on the basis that the node has only two branches. The resulting computational efficiency score is:

$$Score = \frac{\frac{6}{5}\left(1 - \left|\frac{1}{2} - \frac{5}{6}\right|\right)}{5 + 1} = 0.13 \quad (2)$$

Computational efficiency scores are then calculated for a variety of other ways in which that substring could be associated with the node. For example, the possibility of creating a node with three branches may be assessed. If the node were to have three branches and a range of zero, it could also be associated with the substring "6.0.1" (which occurs at the same character position as "5.1.1" and comprises the same number of characters). Assuming that the search operation takes a maximum of two comparisons, the computational efficiency score for such a node is:

$$\text{Score} = \frac{\frac{6}{3}\left(1 - \left|\frac{1}{3} - \frac{3}{6}\right|\right)}{5 + 2} = 0.27 \quad (3)$$

The computational efficiency score of Equation (3) is greater than that of Equation (2), which indicates that a node with three branches would provide better performance than a node with two branches. Although the node with three branches takes more operations to evaluate, the number of nodes it rules out for future evaluation is large enough to outweigh this comparative additional computational cost of the node.

Similarly, the range of character positions to search may be considered when assessing the performance of a node. Using the character sequence "Build" (see Table 12) as an example, the optimal node with two branches is formed when the "First Index" and "Last Index" fields both point to character position 53. Making the previous assumptions, the computational efficiency score for such a node is:

$$\text{Score} = \frac{\frac{6}{4}\left(1 - \left|\frac{1}{2} - \frac{4}{6}\right|\right)}{5} = 0.25 \quad (4)$$

If the range were to be extended by making the "First Index" field point to character position 45 (whilst the "Last Index" field continues to point to character position 53), the node could additionally represent the "Build" substring of device U2 (see Table 12). This increases the numerator of the computational efficiency score, but also increases the denominator. When a rolling hash is used, the number of operations will be the five needed to calculate the first hash, an additional operation for each character it needs to shift, and a comparison for each hash. The computational efficiency score is:

$$\text{Score} = \frac{\frac{6}{3}\left(1 - \left|\frac{1}{2} - \frac{3}{6}\right|\right)}{5 + 8 + 9} = 0.09 \quad (5)$$

The computational efficiency score of Equation (5) demonstrates that extending the range incurs a performance penalty. Hence, ranges are usually small (i.e. the values of the "Last Index" and "First Index" fields differ by only a small amount). However, ranges have the additional benefit of allowing the Identification process to identify unknown devices whose User-Agents comprise a known character sequence at a character position that is not seen in the training data 304.

By calculating computational efficiency scores for each of the substrings identified in step 704 for a variety of different node parameters (e.g. the number of branches, "First Index" value and "Last Index" value), the optimal node to be created at step 710 can be found through a process of trial and error.

It will be appreciated that Equation (1) is presented only as an example of a computational efficiency score that is suitable for carrying out the present disclosure. Other ways of calculating computational efficiency scores will occur to those skilled in the art in the light of the present disclosure.

For example, a computational efficiency score may be based upon the popularity of the devices going into the node. Popular devices will have to be matched more often than less popular devices, so there is an efficiency gain to be found in ensuring more popular devices are matched quickly (at the expense of detection time for less popular devices). This can be achieved by giving a high score to prospective nodes which result in leaf nodes 406 containing popular devices being closest to the root node 402 of the data structure 400. The popularity of devices may be determined in any suitable manner. For example, analysis of a log of visitors to a website may be used to rank the popularity of devices that are used to access that website.

At step 710, a node of the data structure 400 is created. The computational efficiency scores calculated at step 708, or any other method of determining the best node, may be used to decide the optimum node to create. The node may be created by creating a header and one or more records as described above with reference to Tables 2 and 3. However, the scope of the claims is not limited to nodes having that specific format, and the node may be created in any other suitable format. Step 710 may optionally include populating the node with some, but not all, of the data that it will eventually include. For example, the "First Index", "Last Index" and "Length" fields may be populated during step 710, whilst the remaining fields are left empty to be populated during steps 712, 714 and 716.

At step 712, the newly-created node is associated with one or more substrings. A hash function is performed upon each character sequence of the one or more substrings, and the resulting hash value(s) are stored in respective "Hash" fields of the node. The newly-created node is thereby associated with one or more substrings. Any suitable hash function can be used. The hash function may be a rolling hash function, which may be the Rabin-Karp rolling hash function.

In embodiments that make use of computational efficiency scores, the newly-created node may be associated with the one or more substrings that resulted in the highest score at step 708. The recursive process for creating the data structure 400 that is described herein will cause nodes closest to the root node 402 to be associated with substrings having the highest computational efficiency scores. The data structure 400 will thus be configured to reduce the amount of computation required to traverse the data structure from the root note 402 to a leaf node 406, thereby reducing the time taken to identify a target device.

At step 714, a reference is created from the newly-created node to each of its child nodes. For example, the "Unmatched Node" field and each of the "Matched Node" fields may be populated with references to the yet to be constructed child nodes. It is unimportant that the child nodes do not yet exist, as the fields can point to where a node will be placed once it is created.

The method then returns to step 708 (or, in embodiments that do not make use of computational efficiency scores, to step 710) to build each child of the node which was just created, where each child node is determined using only the devices to which it applies. Steps 708, 710, 712 and 714 are recursively performed to create all of the nodes required to identify each device in the training data 304.

Although recursively calculating computational efficiency scores for all nodes of the data structure 400 is computationally intensive, steps 708 to 716 lend themselves well to parallelization. This is because each subtree of any node can be calculated in isolation from other subtrees of that node, because each subtree contains devices that are not found in any of its siblings. Thus, steps 708 to 716 can advantageously be performed in parallel on separate subtrees of the data structure.

At step 716, a node is associated with one or more properties of one or more communication devices. For example, a node can be associated with a property by storing a device identifier in the node. As another example, a node can be associated with a property by storing an identifier of a profile (such as those described above with reference to Tables 5, 6 and 7) in the node. As yet another example, a node can be associated with a property by storing the value of the property in the node.

Any node on the path through the data structure 400 that identifies a particular communication device can be associated with a property of that device. Multiple nodes on the path may be associated with different properties of the same device. However, in the example implementation of the data structure 400 that is described above with reference to Tables 2 and 3, only leaf nodes are associated with the properties of a respective communication device. In this example implementation, a node is associated with a property by adding a respective device identifier to the "Device" field of each leaf node. The device identifier may reference a device record, which includes the properties of a communication device.

In implementations where the leaf nodes are not associated with substrings (such as the example implementation described above with reference to Tables 2 and 3), the leaf nodes may be created at step 716 instead of step 710.

The data structure 400 may optionally be optimised after steps 708 to 716 have been completed. More specifically, the data structure 400 may be optimised to remove redundant nodes, in order to reduce the size of the data structure 400. This can be achieved by searching the data structure 400 to find any duplicate subtrees. Two or more subtrees are considered to be duplicates if they are complete subtrees (i.e. all paths end in a leaf node) whose only differentiating feature is the node which points to the top node of each subtree. If any duplicated subtrees are found, one of the duplicated subtrees is retained, and the other duplicated subtrees are deleted from the data structure 400. All nodes that reference the top node of a deleted subtree are updated to reference the top node of the retained subtree. In this manner, a node can have multiple parent nodes. The size of the data structure 400 is thereby reduced.

At step 718, the data structure 400 created at step 706 is stored, thus forming the dataset 306. The dataset 306 is stored as one or more records on a computer-readable medium, thus enabling the dataset to be deployed to a remote service that will use the dataset to identify the properties of communication devices. Any suitable computer-readable medium can be used to store the dataset, including volatile and non-volatile media. The dataset can also exist as a transient signal (such as an electrical, electromagnetic or optical signal) during deployment.

The dataset 306 may optionally comprise the profiles 410, together with associated information such as properties and the value(s) of each property. Thus, for example, the dataset 306 may include tables similar to Tables 5 to 9. It is preferable to include the profiles and associated information in the dataset 306, since this allows all of the information needed to identify the properties of a communication device to be deployed to a remote service in a single package. Alternatively, the profiles and associated information may be stored and deployed separately from the dataset 306.

The dataset 306 may be stored in any suitable format, such as XML, a bespoke binary format, or auto-generated source code. Other formats such as JavaScript Object Notation (JSON) could be used, depending on the capabilities of the remote service.

Figure 8:
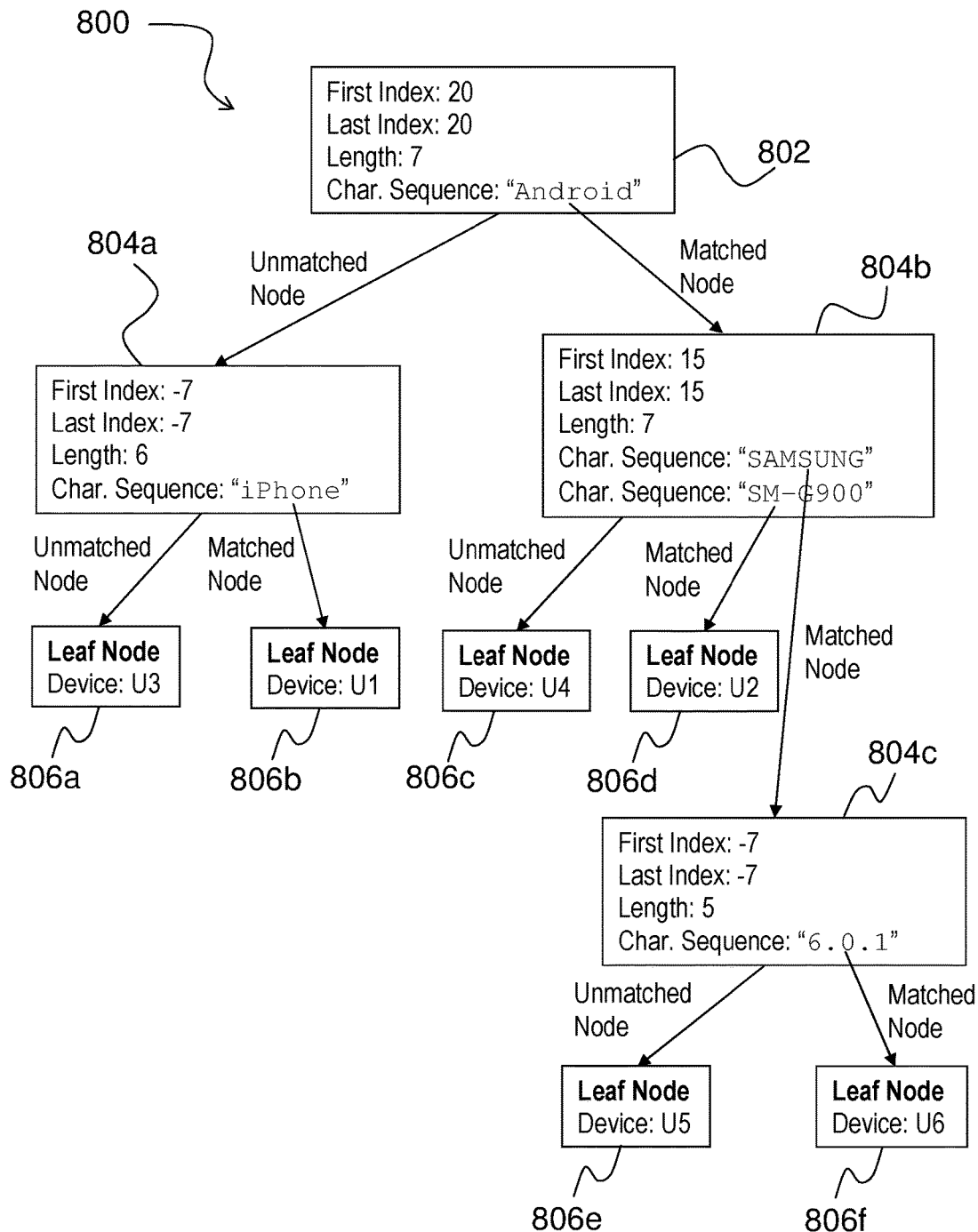
FIG. 8 is schematic diagram of an example of a data structure created using the method shown in FIG. 7.

FIG. 8 is a schematic diagram of an example of a data structure 800 created by performing method 700 upon the User-Agents shown in Table 10. For ease of explanation, FIG. 8 shows a character sequence (rather than the hash value thereof) in each non-leaf node 802, 804. In practice, however, nodes contain a hash value as explained above. Also for ease of explanation, FIG. 8 shows the "First Index" and "Last Index" fields in the same node as the character sequence(s) to which they relate. However, as explained above in relation to Tables 2 and 3, the "First Index" and "Last Index" fields may be stored in the parent node.

As shown in FIG. 8, the six User-Agents of Table 10 can be represented by a data structure 800 having one root node 802, three branch nodes 804a-c, and six leaf nodes 806a-f. The root node 802 is associated with the substring containing the character sequence "Android" at character position 20. This causes the data structure 800 to be split into two branches having an equal number of nodes. The first branch comprises branch node 804a, which is associated with the substring containing the character sequence "iPhone" at character position 13 (and, therefore a value of −7 is stored in the "First Index" and "Last Index" field, since character position 13 is seven characters to the left of character position 20, which is the last evaluated character position). Branch node 804a has two leaf nodes, 806a and 806b, which are associated with devices having the identifiers U3 and U1 respectively. Thus, for example, the device with identifier U3 is uniquely identified by a path through the data structure from the root node 802 to leaf node 806b via branch node 804a. The second branch, which comprises branch node 804b, is structured according to similar principles and need not be described in detail. It can be seen that data structure 800 allows all six User-Agents to be represented by only five hash values. The data structure 800 thus requires significantly less storage space than if the User-Agents themselves were to be stored. Furthermore, the data structure 800 may allow devices to be identified more quickly and/or more accurately than a trie, for the reasons discussed above.

It will be appreciated that FIG. 8 shows a very simple example of a data structure, created using a small number of User-Agents. In practice, the data structure 400 will be based upon a significantly greater number of User-Agents, so as to allow more devices to be accurately identified. Thus, in practice, the data structure 400 will be more complicated than that shown in FIG. 8.

Figure 9:
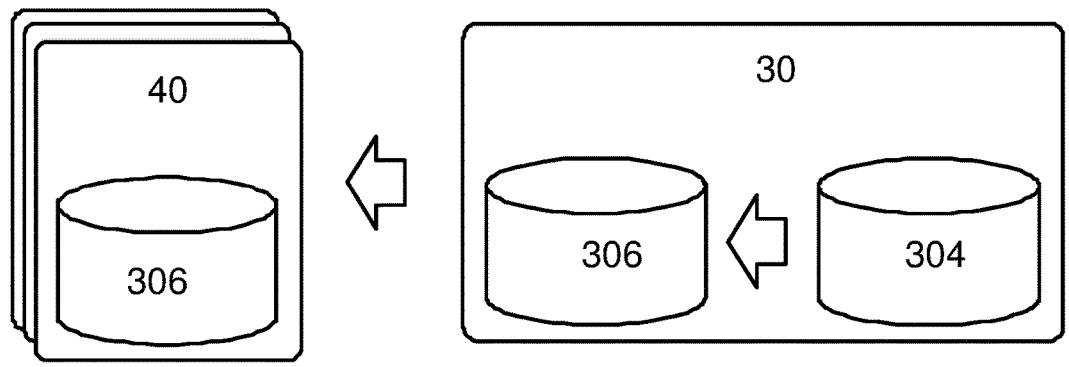
FIG. 9 is a schematic diagram of a system for generating and deploying a dataset.

FIG. 9 is a schematic diagram of a system for generating and deploying the dataset 306. A first computer system 30 processes the training data 304 according to the method illustrated in FIG. 3, so as to generate the dataset 306. The dataset 306 is then deployed to one or more remote services 40, such as a web site. The remote services 40 can use the dataset 306 to identify the properties of communication devices, in the manner that will now be discussed.

Identification

Figure 10:
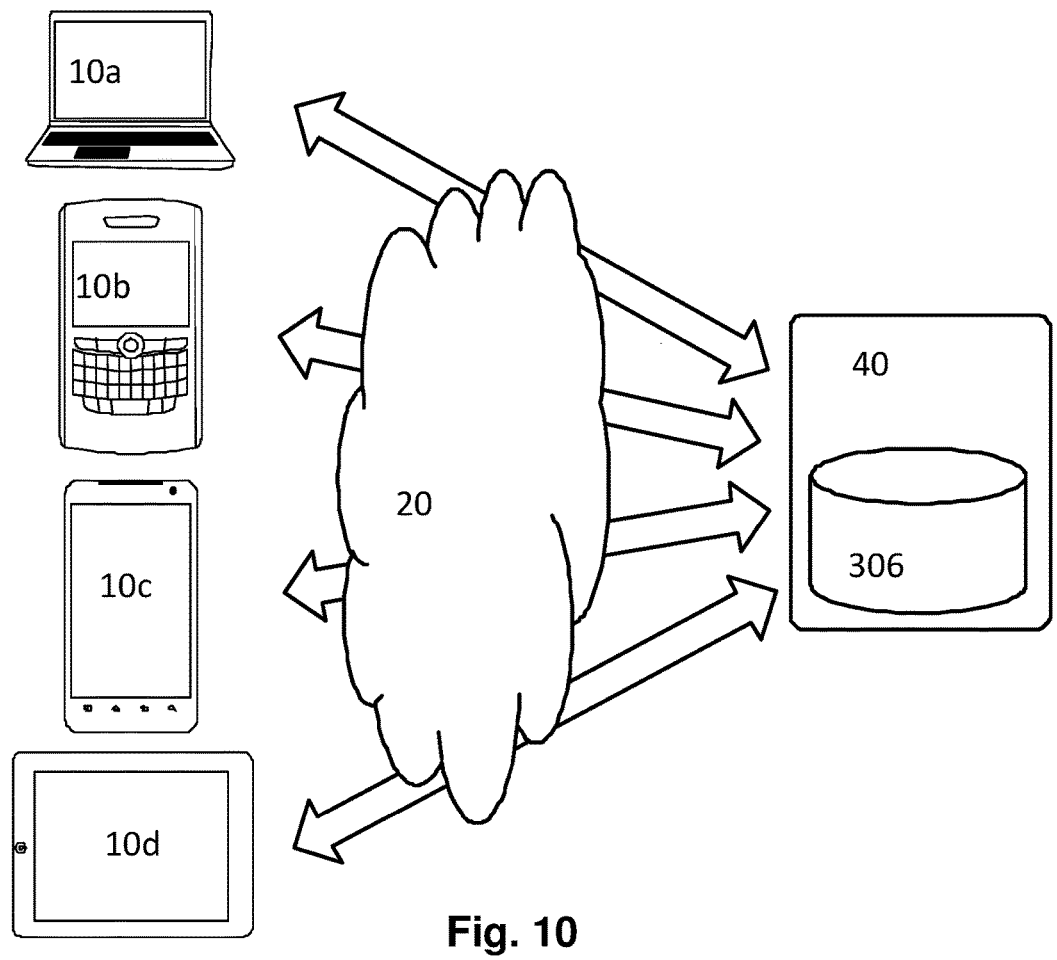
FIG. 10 is a schematic diagram of a system for identifying a property of a communication device.
Figure 11:
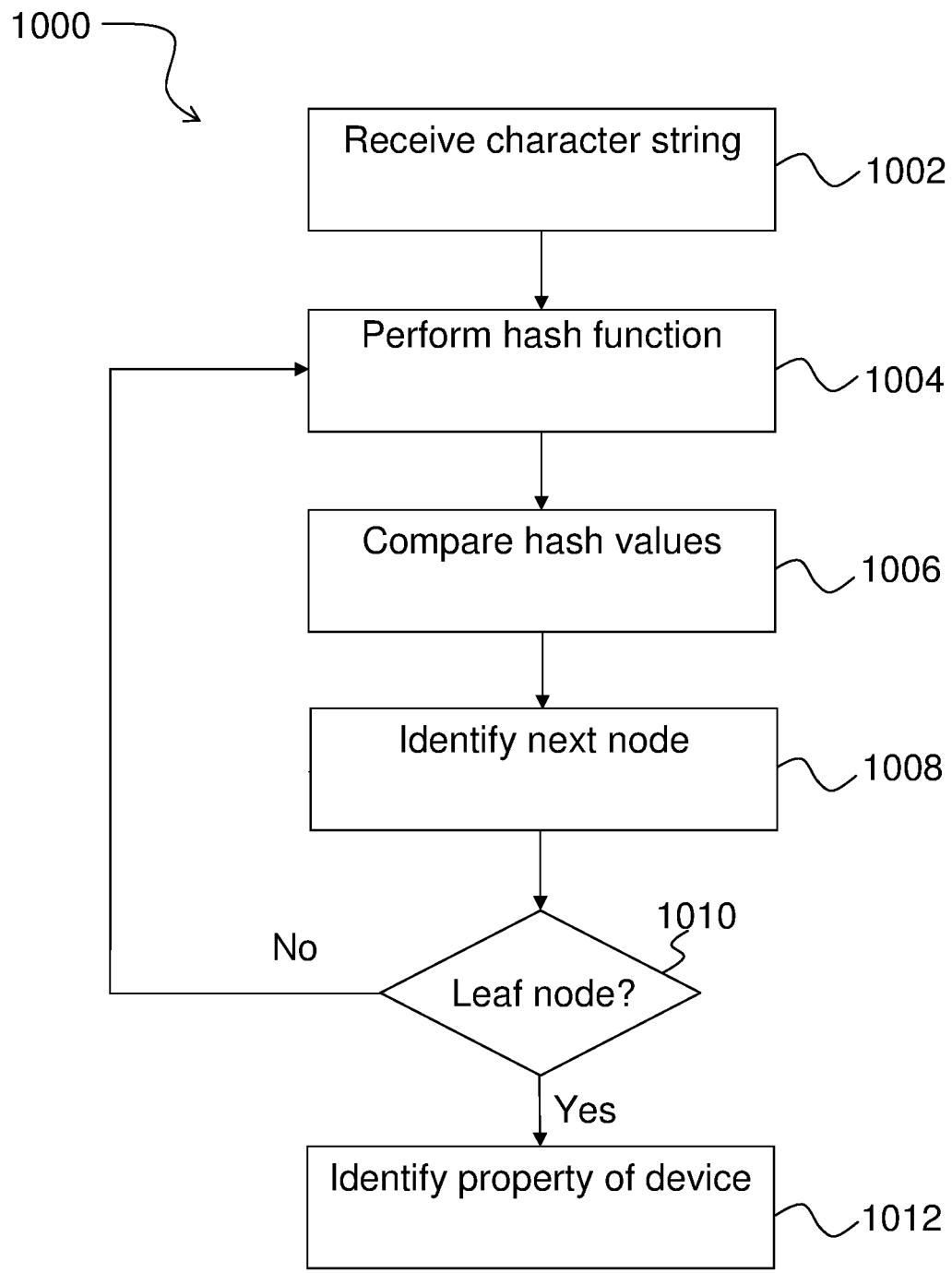
FIG. 11 is a flow diagram of a method of identifying a property of a communication device.

The identification process will now be described with reference to FIGS. 10 and 11. FIG. 10 is a schematic diagram of a system for identifying the properties of communication devices. FIG. 11 is a flow diagram of a method 1000 of identifying a property of a communication device. The method of FIG. 11 is performed by a remote service 40, such as a web server. The remote service 40 comprises the dataset 306, which was generated in the manner described above. The remote service 40 can communicate with one or more target devices 10 via a communication network 20. The target devices may include a laptop computer 10*a*, a mobile phone 10*b*, a smartphone 10*c*, a tablet computer 10*d* and/or any other suitable type of communication device. The communication network 20 may include any suitable wire-based or wireless communication network.

The method 1000 begins at step 1002, when the remote service 40 receives a User-Agent from a target device 10. The target device 10 may transmit the User-Agent to the remote service when requesting a web page, in a manner that is known to those skilled in the art.

The method comprises a step 1004 of performing a hash function, a step 1006 of comparing hash values, and a step 1008 of identifying a next node. Steps 1004, 1006 and 1008 are performed iteratively. More specifically, steps 1004, 1006 and 1008 are first performed at the root node 402 of the data structure 400, which results in a next node of the data structure to evaluate being identified. Steps 1004, 1006 and 1008 are then repeated on the next node. The process proceeds iteratively until a leaf node 406 is reached. In this manner, the data structure 400 is searched from the root node 402 to a leaf node 406.

At step 1004, a hash function is performed on a sequence of characters in the received User-Agent to generate a hash value. The hash function that is performed should be the same hash function that was used when creating the dataset 306. Thus, if the hash values in the dataset 306 were calculated using the Rabin-Karp rolling hash function, the Rabin-Karp rolling hash function should also be performed at step 1004.

For example, the hash function may be performed on a sequence of characters that begins at the character position indicated by the value of the "First Index" field of a current node's parent node. In this example, the length of the sequence of characters upon which the hash function is performed is indicated by the value of the "Length" field of the current node. When the value of the "Last Index" field is equal to the value of the "First Index" field, a hash function is performed on only one substring in the User-Agent of the target device 10. However, when the value of the "Last Index" field of the current node's parent node is different from the value of the "First Index" field, a hash function is performed on multiple substrings in the User-Agent of the target device 10 to generate multiple hash values. That is, the hash function is performed on multiple sequences of characters, each of which occurs at a different character position within the range indicated by the "First Index" and "Last Index" fields of the current node's parent node. Each sequence of characters may be hashed in either ascending or descending character index. Similarly, the sequences of characters may be ordered by ascending or descending character index.

The use of a rolling hash function allows the hash values of multiple sequences of characters to be calculated quickly and efficiently. For example, the value of the hash function can first be calculated for a sequence of characters that begins at the character position indicated by the "First Index" field. The moving window of the rolling hash function can then be shifted by: adding a value related to the character at the character position whose index is equal to the value of the "First Index" field plus the value of the "Length" field plus one; and deleting a value related to the character at the character position indicated by the "First Index" field. The process of shifting the moving window can then be repeated until the start of the window is located at the character position indicated by the "Last Index" field, with a different hash value being calculated at each position of the window. The window may be moved from right to left (i.e. towards character position zero), or from left to right (i.e. away from character position zero).

At step 1006, a hash value generated at step 1004 is compared with the hash value, or hash values, stored by the node. When more than one hash value is stored by the node, any suitable method can be used to search the node for a hash value that is equal to a hash value generated at step 1004. For example, a linear search algorithm, a binary search algorithm or a hash table may be used.

In general, step 1006 comprises determining whether a hash value generated at step 1004 is equal to a hash value stored by the node. However, step 1006 may also comprise determining whether a hash value generated at step 1004 is within a predefined tolerance of a hash value stored by the node. This can be achieved using a hash function with the property that, when two sequences of characters differ only by their final character, the difference between the hash values of those sequences of characters is directly related to the difference in the ASCII values of the final characters. The Rabin-Karp rolling hash function is an example of a hash function with this property.

For example, if the data structure 400 has a node associated with the substring "Chrome 56", that node may store a hash value of 54654. If the User-Agent of the target device 10 contains the substring "Chrome 57", the hash value of that sequence of characters may be 54655. The two hash values thus differ by a value of one. If the predefined tolerance is set to one (or greater than one), the target device 10 may be considered to match the node, even though its hash value is not equal to that stored by the node. The next node in the path through the data structure 400 may thus be that indicated by the "Matched Node" field, rather than the "Unmatched Node" field. In this manner, a previously-unknown target device 10 can be identified with reasonable accuracy. The predefined tolerance can be set to any suitable value. It will be appreciated that increasing the tolerance value may decrease the accuracy of the Identification process.

When step 1004 involves calculating multiple hash values at different character positions within the range indicated by the "First Index" and "Last Index" fields, step 1006 may be performed after each hash value is calculated. In this case, the hash value for the next character position may be calculated only if the hash value for the current character position is not equal to any of the hash values stored by the node. In this manner, unnecessary calculation of hash values can be avoided, thereby improving the speed of the Identification process.

At step 1008, the next node to evaluate is identified. For example, if a hash value generated at step 1004 is equal to a hash value stored by the node, the next node is identified from the "Matched Node" field of the record whose "Hash" field was matched. Alternatively, if the hash value generated at step 1004 is not equal to a hash value stored by the node, the next node is identified from the "Unmatched Node" field of the current node.

At decision block 1010, it is determined whether the next node is a leaf node. If the next node is not a leaf node, the method returns to step 1004. On the other hand, if the next node is a leaf node, this implies that the target device 10 has been identified. Accordingly, the method proceeds to step 1012, at which a property of the communication device is retrieved.

At step 1012, a property of the target device 10 is identified. For example, the unique identifier of the target device can be read from the "Device" field of the leaf node 406. The unique identifier may identify one or more profiles 410, each of which includes the values of one or more properties of the target device 10. The values of some or all of the properties can thus be retrieved from the profiles 410 identified by the unique identifier of the target device 10.

The operation of the method 1000 of identifying a property of a communication device will now be illustrated with reference to the example data structure 800 shown in FIG. 8.

First consider the case in which the User-Agent received from the target communication device 10 was also present in the training data 306. For example, assume that the received User-Agent is that with the identifier U2 in Table 10. The data structure 800 is searched starting from its root node 802, which is associated with a sub string comprising the character sequence "Android" at character position 20. Hence, a hash function is performed on the seven characters of the received User-Agent starting at character position 20 (i.e. "Android"). The resulting hash value will match the hash value stored in the root node 802. Hence, branch node 804b will be identified as the next node to be evaluated. Node 804b is associated with two substrings, which comprise the character sequences "SAMSUNG" and "SM-G900" respectively, and which occur fifteen characters to the right of the last evaluated character position. Hence, a hash function is performed on the seven characters of the received User-Agent starting at character position 35 (i.e. "SM-G900"). The resulting hash value will match the second hash value stored in node 804b, and node 806d will be identified as the next node. Node 806d is a leaf node and, therefore, one or more properties can be identified using the unique identifier of the target device 100 in the "Device" field of the leaf node 806d.

Now consider the case in which the User-Agent received from the target communication device 10 was not present in the training data 306. For example, assume that the received User-Agent is "Mozilla/5.0 (Linux; Android 6.0.1; SM-G900R4 Build/MOB30Z) AppleWebKit/537.36 (KHTML, like Gecko) Chrome/55.0.2883.91 Mobile Safari/537.36". This User-Agent differs from User-Agent U2 in that it comprises a substring with the character sequence "MOB30Z" at character position 51. However, because this substring is not associated with any of the nodes of the data structure 800, it is not used when identifying the target device 10. Hence, the data structure 800 will be traversed in exactly the manner described in the previous paragraph. The target device 10 will thus be correctly identified, even though its User-Agent was not present in the training data 306. This example illustrates how the data structure disclosed herein can allow devices to be identified more accurately than a trie, due to its ability to avoid storing characters that are irrelevant to the properties of a target device.

The ability to identify target devices whose User-Agents are not present in the training data can be further enhanced by searching the User-Agent of the target device 10 for substrings that occur within a predefined range of the character position of the substring associated with a node. This can be implemented by modifying the "First Index" and/or "Last Index" values used when performing the hash function at step 1004. As mentioned above, step 1004 usually involves performing a hash function on a sequence of characters at one or more character positions indicated by the "First Index" and "Last Index" values of a node's parent node. Assuming that the "Last Index" value is greater than the "First Index" value, then searching within a predefined range can be implemented by incrementing the "Last Index" value and/or by decrementing the "First Index" value. For example, the "Last Index" value may be incremented by an integer, r, and the "First Index" value may be decremented r. By doing so, variations in a User-Agent can be accounted for. The integer r can have any suitable value.

For example, if a space is inserted at the first character position of the User-Agent of a target device, then any substrings in the User-Agent will be shifted to the right by one character. This may prevent the target device from being correctly identified. However, if the "Last Index" value of a node's parent node is incremented by one, the target device can still be correctly identified.

Test Results

Comparative tests have been performed to quantify the performance improvements that can be achieved by the methods disclosed herein.

Where the training data contains 10 million User-Agents, a trie-based algorithm can identify around seven million devices per second when given random User-Agents from the training data. Using the methods disclosed herein, over twenty-two million devices per second can be identified, where all other factors such as hardware, operating system and other workload are identical. Thus, the methods disclosed herein have been found to improve identification performance by approximately three times in comparison to a trie-based algorithm.

A dataset generated according to the methods disclosed herein requires approximately 340 megabytes to store information relating to 32 million User-Agents. In contrast, storing the same number of User-Agents in a trie requires approximately 1.6 gigabytes of storage. Thus, the methods disclosed herein have been found to improve storage efficiency by nearly five times.

Additional Embodiments

The present disclosure can also be combined with the disclosure of the applicant's earlier patent, European Patent No. 2 871 816, the entire contents of which are incorporated herein by reference. The earlier patent discloses a dataset comprising a plurality of data structures, each of which is designated for storing substrings that occur at a particular character position in a User-Agent. The earlier patent further discloses that the plurality of data structures may comprise a plurality of tries. However, the dataset disclosed in the earlier patent can be implemented by using a plurality of the data structures 400 as disclosed herein, in place of the plurality of tries. Each of the data structures 400 is generated in the manner disclosed herein. The data structures 400 are searched in the manner disclosed herein. More specifically, a data structure is searched from its root node 402 to a leaf node 406, and the leaf node 406 is associated with a unique identifier. The unique identifiers found by searching a plurality of the data structures 400 are combined to form a signature, as described in the earlier patent. The signature may be used to identify a device and its properties.

By using the data structures 400 disclosed herein when implementing the disclosure of the earlier patent, the size of the dataset disclosed in the earlier patent can be reduced even further and/or the properties of a target device can be identified even more quickly than disclosed in the earlier patent. The claims set out below should preferably be regarded as encompassing above-described combination of the present disclosure with that of the earlier patent.

Hardware Implementation

Figure 12:
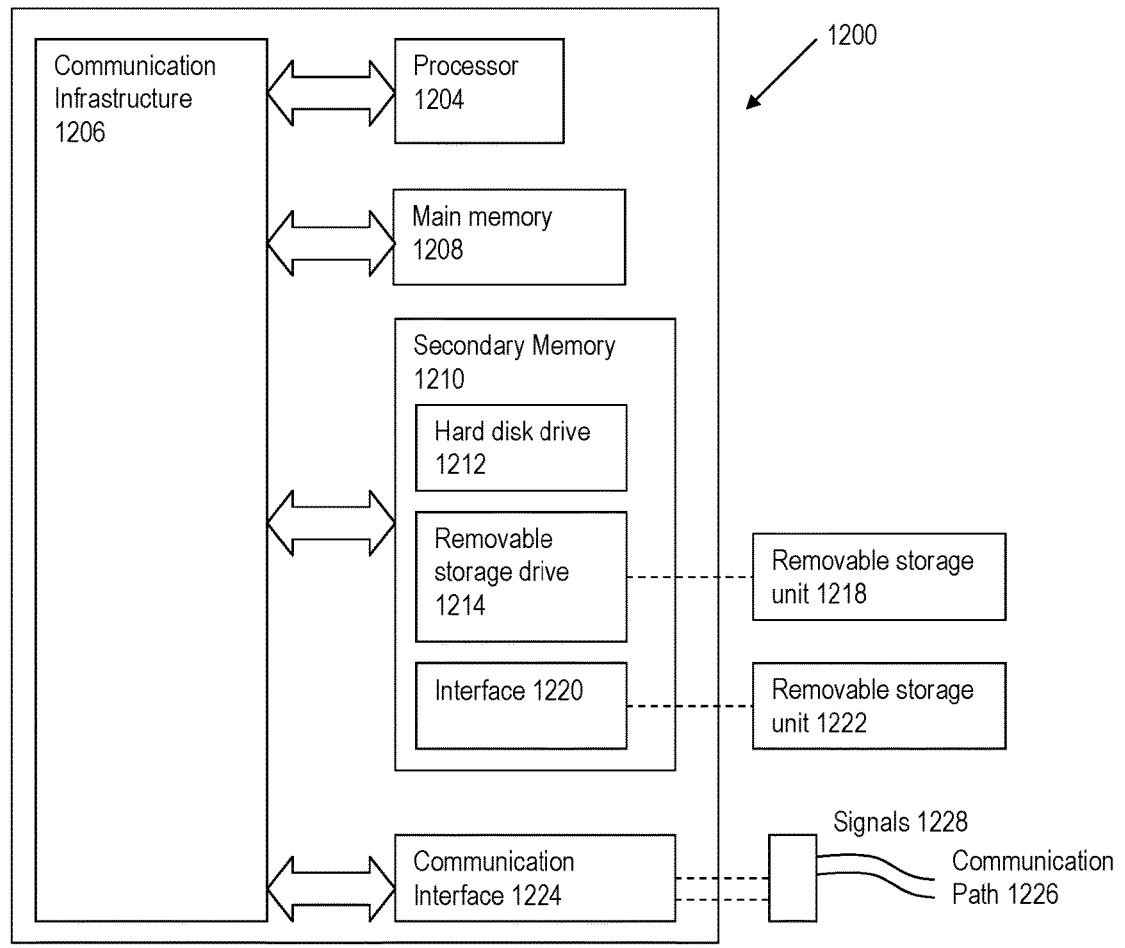
FIG. 12 is a schematic diagram of a computer system suitable for implementing the present disclosure.

An example of an apparatus that can be used to implement the invention will now be described with reference to FIG. 12. Embodiments of the present invention may be implemented as computer program code for execution by the computer system 1200. Various embodiments of the invention are described in terms of this example computer system 1200. After reading this description, it will become apparent to a person skilled in the art how to implement the invention using other computer systems and/or computer architectures.

Computer system 1200 includes one or more processors, such as processor 1204. Processor 1204 may be any type of hardware processor, including but not limited to a special purpose or a general-purpose digital signal processor. Processor 1204 is connected to a communication infrastructure 1206 (for example, a bus or network). Various software implementations are described in terms of this exemplary computer system. After reading this description, it will become apparent to a person skilled in the art how to implement the invention using other computer systems and/or computer architectures.

Computer system 1200 also includes a main memory 1208, preferably random access memory (RAM), and may also include a secondary memory 1210. Secondary memory 1210 may include, for example, a hard disk drive 1212 and/or a removable storage drive 1214, representing a floppy disk drive, a magnetic tape drive, an optical disk drive, etc. Removable storage drive 1214 reads from and/or writes to a removable storage unit 1218 in a well-known manner. Removable storage unit 1218 represents a floppy disk, magnetic tape, optical disk, etc., which is read by and written to by removable storage drive 1214. As will be appreciated, removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that previously found in video game devices), a removable memory chip (such as an EPROM, or PROM, or flash memory) and associated socket, and other removable storage units 1222 and interfaces 1220 which allow software and data to be transferred from removable storage unit 1222 to computer system 1200. Alternatively, the program may be executed and/or the data accessed from the removable storage unit 1222, using the processor 1204 of the computer system 1200.

Computer system 1200 may also include a communication interface 1224. Communication interface 1224 allows software and data to be transferred between computer system 1200 and external devices. Examples of communication interface 1224 may include a modem, a network interface (such as an Ethernet card), a communication port, a Personal Computer Memory Card International Association (PCMCIA) slot and card, etc. Software and data transferred via communication interface 1224 are in the form of signals 1228, which may be electronic, electromagnetic, optical, or other signals capable of being received by communication interface 1224. These signals 1228 are provided to communication interface 1224 via a communication path 1226. Communication path 1226 carries signals 1228 and may be implemented using wire or cable, fibre optics, a phone line, a wireless link, a cellular phone link, a radio frequency link, or any other suitable communication channel. For instance, communication path 1226 may be implemented using a combination of channels.

The terms "computer program medium" and "computer usable medium" are used generally to refer to media such as removable storage drive 1214, a hard disk installed in hard disk drive 1212, and signals 1228. These computer program products are means for providing software to computer system 1200. However, these terms may also include signals (such as electrical, optical or electromagnetic signals) that embody the computer program disclosed herein.

Computer programs (also called computer control logic) are stored in main memory 1208 and/or secondary memory 1210. Computer programs may also be received via communication interface 1224. Such computer programs, when executed, enable computer system 1200 to implement the present invention as discussed herein. Accordingly, such computer programs represent controllers of computer system 1200. Where the invention is implemented using software, the software may be stored in a computer program product and loaded into computer system 1200 using removable storage drive 1214, hard disk drive 1212, or communication interface 1224, to provide some examples.

In alternative embodiments, the invention can be implemented as control logic in hardware, firmware, or software or any combination thereof.

It will be understood that the invention has been described above purely by way of example, and that modifications of detail can be made within the scope of the invention. For example, whilst the invention has been described in the context of Hyper Text Transfer Protocol and User-Agents, other suitable protocols and information for identifying communication devices could also be used.

The invention claimed is:

1. A computer-implemented method of generating information for use in identifying a property of a communication device, the method comprising:
   receiving training data comprising a plurality of character strings, wherein each character string identifies a respective communication device;
   identifying a plurality of substrings within each character string, each substring comprising a sequence of characters; and
   creating a data structure having multiple nodes by:
      associating each of a plurality of nodes of the data structure with a respective substring by storing, in association with the node, a hash value generated by performing a hash function on the sequence of characters of the substring, such that the data structure stores hash values of a minimal set of substrings that allows each device in the training data to be uniquely identified,
      creating references between nodes to define a plurality of paths through the data structure, whereby each path identifies a respective communication device, and
      associating a node in each path with a property of the communication device identified by that path.

2. The computer-implemented method of claim 1, further comprising associating at least one of the plurality of nodes with a plurality of different substrings.

3. The computer-implemented method of claim 2, wherein the plurality of different substrings includes at least one of:
  different sequences of characters occurring at a common character position in the character strings of different communication devices, or
  different sequences of characters occurring at different character positions in the character strings of different communication devices.

4. The computer-implemented method of claim 3, wherein associating at least one of the plurality of nodes with a plurality of different substrings comprises:
  storing, in association with the at least one of the plurality of nodes, a plurality of hash values, each hash value generated by performing the hash function on a respective one of the different sequences of characters.

5. The computer-implemented method of claim 2, wherein the plurality of different substrings includes at least one of:
  a common sequence of characters occurring at different character positions in the character strings of different communication devices, or
  different sequences of characters occurring at different character positions in the character strings of different communication devices.

6. The computer-implemented method of claim 5, wherein associating at least one of the plurality of nodes with a plurality of different substrings comprises:
  associating at least one of the plurality of nodes with data indicating the different character positions at which each sequence of characters of the different substrings can occur in the character strings of different communication devices.

7. The computer-implemented method of claim 1, wherein the hash function is a rolling hash function.

8. The computer-implemented method of claim 1, further comprising:
  calculating a computational efficiency score for a plurality of substrings; or
  associating nodes closest to a root node of the data structure with substrings having a highest computational efficiency scores.

9. The computer-implemented method of claim 8, wherein the computational efficiency score is based on how effectively the data structure would be split into a plurality of branches with an equal number of leaf nodes by associating a node with a particular substring.

10. The computer-implemented method of claim 8, wherein the computational efficiency score is based on a computational effort required to find the hash value for the substring in a node.

11. A computer-implemented method of identifying a property of a communication device, the method comprising:
  receiving a character string that identifies the communication device;
  searching a data structure having multiple nodes, wherein at least some of the nodes store a hash value, wherein the data structure stores hash values of a minimal set of substrings that allows unique identification of each of a plurality of communication devices in training data used to create the data structure, and wherein the searching comprises iteratively performing the following operations for each of a plurality of nodes of the data structure:
    performing a hash function on a sequence of characters in the received character string to generate a hash value,
    comparing the generated hash value with the hash value stored by the node, and
    identifying a next node of the data structure to evaluate based on a result of the comparison; and
  identifying a property of the communication device, wherein the property is associated with a node identified by searching the data structure.

12. The computer-implemented method of claim 11, wherein:
  performing the hash function comprises performing a rolling hash function on a plurality of sequences of characters in the received character string to generate a plurality of hash values, wherein each of the plurality of sequences of characters occurs at a different character position; and
  comparing the generated hash value comprises comparing each of the plurality of generated hash values with the hash value stored by the node.

13. The computer-implemented method of claim 11, wherein at least one node of the data structure stores a plurality of hash values, and wherein comparing the generated hash value comprises:
  comparing the generated hash value with at least some of the plurality of hash values stored by the node until a matching hash value is found or until the generated hash value has been compared with all of the plurality of hash values.

14. A non-transitory computer-readable medium comprising information for use in identifying a property of a communication device, the communication device being arranged to transmit a character string that identifies the communication device, the character string comprising a plurality of substrings, each substring comprising a sequence of characters, wherein the information comprises:
  a data structure having multiple nodes, wherein:
    each of a plurality of nodes of the data structure stores a respective hash value, wherein each hash value corresponds to the hash value that would be generated by performing a hash function on the sequence of characters of each substring;
    the data structure stores hash values of a minimal set of substrings that allows unique identification of each of a plurality of communication devices in training used to create a data structure;
    the data structure comprises references between the plurality of nodes, wherein the references define a path through the data structure that identifies the communication device; and
    a node on the path is associated with a property of the communication device.

15. The non-transitory computer-readable medium of claim 14, wherein the references define a plurality of paths through the data structure, each of the plurality of paths identifying a different communication device.

16. The non-transitory computer-readable medium of claim 14, wherein at least one of the plurality of nodes is associated with a plurality of different substrings, wherein each of the plurality of different substrings is part of a respective character string that identifies a respective communication device.

17. The non-transitory computer-readable medium of claim 16, wherein the plurality of different substrings includes at least one of:
different sequences of characters occurring at a common character position in character strings that identify different communication devices, or
different sequences of characters occurring at different character positions in character strings that identify different communication devices.

18. The non-transitory computer-readable medium of claim 17, wherein the least one of the plurality of nodes stores a plurality of hash values, each of the plurality of hash values generated by performing the hash function on a respective one of the different sequences of characters.

19. The non-transitory computer-readable medium of claim 16, wherein the plurality of different substrings includes at least one of:
a common sequence of characters occurring at different character positions in character strings that identify different communication devices, or
different sequences of characters occurring at different character positions in character strings that identify different communication devices.

20. The non-transitory computer-readable medium of claim 19, wherein the at least one of the plurality of nodes is associated with data indicating the different character positions.

\* \* \* \* \*